US011852761B2

(12) United States Patent
Liang et al.

(10) Patent No.: US 11,852,761 B2
(45) Date of Patent: Dec. 26, 2023

(54) RADIATION SOURCE LOCALIZATION SYSTEMS AND METHODS

(71) Applicant: Teledyne FLIR Detection, Inc., Stillwater, OK (US)

(72) Inventors: Felix J. Liang, Oak Ridge, TN (US); Kemper Talley, Oak Ridge, TN (US); William T. Milam, Maryville, TN (US); Sean Whalen, Oak Ridge, TN (US); Robert C. Proebstel, Goleta, CA (US); Clinton M. Wichert, West Lafayette, IN (US)

(73) Assignee: Teledyne FLIR Detection, Inc., Stillwater, OK (US)

( * ) Notice: Subject to any disclaimer, the term of this patent is extended or adjusted under 35 U.S.C. 154(b) by 0 days.

(21) Appl. No.: 17/633,182

(22) PCT Filed: Aug. 5, 2020

(86) PCT No.: PCT/US2020/045076
§ 371 (c)(1),
(2) Date: Feb. 4, 2022

(87) PCT Pub. No.: WO2021/026280
PCT Pub. Date: Feb. 11, 2021

(65) Prior Publication Data
US 2022/0268952 A1 Aug. 25, 2022

Related U.S. Application Data

(60) Provisional application No. 62/882,617, filed on Aug. 5, 2019.

(51) Int. Cl.
*G01T 1/24* (2006.01)
*B64C 39/02* (2023.01)
(Continued)

(52) U.S. Cl.
CPC .............. *G01T 1/248* (2013.01); *B64C 39/024* (2013.01); *G01T 1/023* (2013.01); *G01T 1/026* (2013.01);
(Continued)

(58) Field of Classification Search
CPC ......... G01T 1/248; G01T 1/023; G01T 1/026; G01T 1/361; B64C 39/024; B64U 2201/20; B64U 2101/30; G05D 1/102
See application file for complete search history.

(56) References Cited

U.S. PATENT DOCUMENTS 10,024,981 B2   7/2018   Farsoni et al.
10,302,777 B2   5/2019   Newman
(Continued)

FOREIGN PATENT DOCUMENTS

GB   2511754   9/2014

OTHER PUBLICATIONS

Ayaz-Maierhafer, Birsen et al., "Design Optimization for a Wearable, Gamma-Ray and Neutron Sensitive, Detector Array with Directionality Estimation", Nuclear Inst. and Methods in Physics Research, A 870, Apr. 25, 2017, pp. 131-139.

*Primary Examiner* — David P Porta
*Assistant Examiner* — Fani Polyzos Boosalis
(74) *Attorney, Agent, or Firm* — Haynes and Boone, LLP

(57) ABSTRACT

Radiation source localization systems and related techniques are provided to improve the operation of handheld or unmanned mobile sensor or survey platforms. A radiation source localization system includes a logic device configured to communicate with a communications module and a directional radiation detector, where the communications module is configured to establish a wireless communication link with a base station associated with the directional radiation detector and/or a mobile sensor platform, and the (Continued)

directional radiation detector includes a sensor assembly configured to provide directional radiation sensor data as the directional radiation detector is maneuvered within a survey area.

18 Claims, 16 Drawing Sheets

(51) Int. Cl.
*G01T 1/02* (2006.01)
*G01T 1/36* (2006.01)
*G05D 1/10* (2006.01)
*B64U 101/30* (2023.01)

(52) U.S. Cl.
CPC .......... *G01T 1/361* (2013.01); *B64U 2101/30* (2023.01); *B64U 2201/20* (2023.01); *G05D 1/102* (2013.01)

(56) References Cited

U.S. PATENT DOCUMENTS

| | | |
|---|---|---|
| 2009/0309032 A1 | 12/2009 | Ramsden et al. |
| 2012/0114100 A1 | 5/2012 | Gueorguiev et al. |
| 2016/0266260 A1* | 9/2016 | Preston ................. G01T 1/2907 |

* cited by examiner

RADIATION SOURCE LOCALIZATION SYSTEMS AND METHODS

CROSS-REFERENCE TO RELATED APPLICATIONS

This patent application is a U.S. National Stage Patent Application under 35 U.S.C. 371 of International Patent Application No. PCT/US2020/045076 filed Aug. 5, 2020 and entitled "RADIATION SOURCE LOCALIZATION SYSTEMS AND METHODS," which claims priority to U.S. Provisional Patent Application No. 62/882,617 filed Aug. 5, 2019 and entitled "RADIATION SOURCE LOCALIZATION SYSTEMS AND METHODS," which are hereby incorporated by reference in their entirety.

TECHNICAL FIELD

The present invention relates generally to radiation source localization and, more particularly, to systems and methods for radiation source localization using a portable directional radiation detector that can be coupled to a mobile sensor platform.

BACKGROUND

Modern unmanned sensor platforms, such as unmanned aerial vehicles (UAVs), remotely operated underwater vehicles (ROVs), unmanned (water) surface vehicles (USVs), and unmanned ground vehicles (UGVs) are able to operate over long distances and in all environments; rural, urban, and even underwater. Operation of such systems typically includes real-time wireless transmissions between the unmanned platform and a remote base station, which often includes a display to efficiently convey telemetry, imagery, and other sensor data captured by the platform to an operator. The operator can often pilot or otherwise control an unmanned platform throughout an entire mission relying solely on received data from the unmanned platform.

Directional radiation detectors, such as sensor systems configured to detect the relative bearing to a radiation source producing ionizing radiation in an environment, can benefit from handheld deployment or deployment on unmanned sensor platforms, such as to survey an area in order to localize a detected radiation source, but conventional directional radiation detectors are often too heavy or cumbersome to be portable and/or are too inaccurate to provide reliably quick source directionality and localization. Thus, there is a need for portable directional radiation detector systems and techniques to provide directionality and/or localization of ionizing radiation sources.

SUMMARY

Radiation source localization systems and related techniques are provided to improve the operation of handheld or unmanned mobile sensor or survey platforms. One or more embodiments of the described radiation source localization systems may advantageously include a directional radiation detector including a sensor assembly configured to provide radiation source localization data, a communications module configured to establish a wireless communication link with a base station associated with the directional radiation detector and/or a coupled sensor platform, an orientation and/or position sensor to measure orientations and/or positions of the directional radiation detector and/or a coupled mobile platform, a controller to control operation of the communications module, the orientation and/or position sensor, and/or the mobile platform, and one or more additional sensors to measure and provide sensor data corresponding to maneuvering and/or other operation of the mobile platform.

In various embodiments, such additional sensors may include a remote sensor system configured to capture sensor data of a survey area from which a two and/or three-dimensional spatial map of the survey area may be generated. For example, the mapping system may include one or more visible spectrum and/or infrared cameras and/or other remote sensor systems coupled to a mobile platform. The mobile platform may generally be a flight platform (e.g., a manned aircraft, a UAS, and/or other flight platform), a terrestrial platform (e.g., a motor vehicle), a water born platform (e.g., a watercraft or submarine), or a handheld platform.

In one embodiment, a system includes a logic device configured to communicate with a communications module and a directional radiation detector coupled to a mobile platform, wherein the communications module is configured to establish a wireless communication link with a base station associated with the mobile platform, the directional radiation detector comprises a sensor assembly configured to provide directional radiation sensor data as the mobile platform is maneuvered within a survey area. The logic device may be configured to receive the directional radiation sensor data as the mobile platform maneuvers within the survey area; receive orientation and/or position data corresponding to the directional radiation sensor data; and generate radiation source localization survey information corresponding to the survey area based, at least in part, on a combination of the orientation and/or position data and the directional radiation sensor data.

In another embodiment, a method includes receiving directional radiation sensor data from a directional radiation detector coupled to a mobile platform as the mobile platform maneuvers within a survey area; receiving orientation and/or position data corresponding to the directional radiation sensor data; and generating radiation source localization survey information corresponding to the survey area based, at least in part, on a combination of the orientation and/or position data and the directional radiation sensor data.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
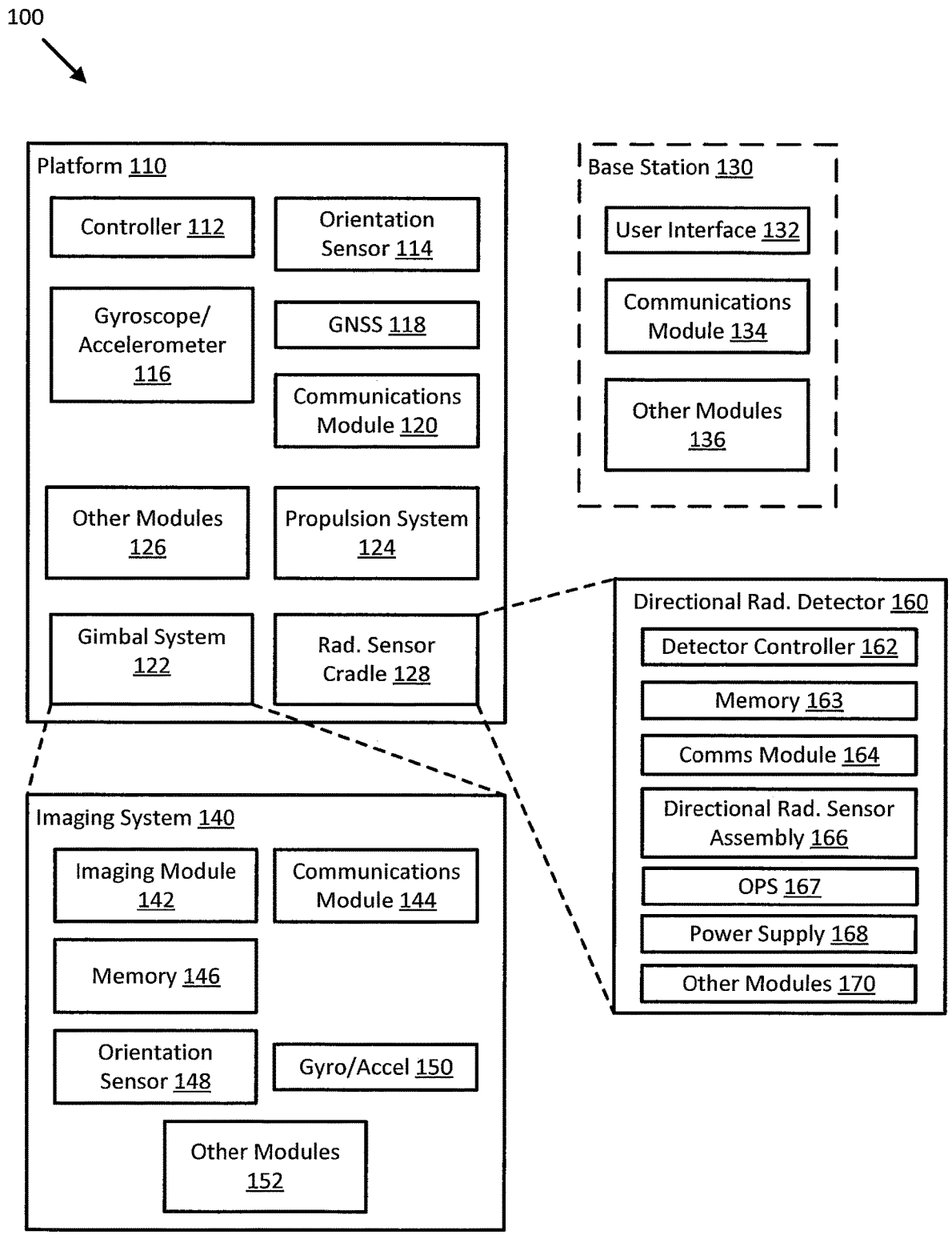
FIG. 1 illustrates a diagram of a radiation source localization system in accordance with an embodiment of the disclosure.

Radiation source localization systems and related techniques are provided to improve the operational flexibility and reliability of sensor platforms. For example, radiation measurement is an effective way to detect and locate nuclear threats. Because detection count rates vary with the distance to a radioactive source, simply moving a radiation detector during a spatial search can be used for estimating a direction to the source. Embodiments described herein increase the speed and efficacy of such approach through simplified occlusion. In a simplest embodiment, two radiation detectors are placed in close proximity with a radiation deflecting, absorbing, or otherwise blocking metal panel (e.g., also referred to herein as a "collimating panel" or an "occluding panel") disposed between the two radiation detectors. The resulting distribution of detection event counts and energy spectra between the two radiation detectors are significantly more sensitive to source angle than alternative approaches. As a result, and because the collimating panel does not significantly limit the sensitivity of the detector arrangement, embodiments are able to localize a radiation source much more quickly than conventional methodologies. Furthermore, such embodiments may be made relatively compactly, thereby reducing size, weight, and power requirements (relative to conventional systems), and are therefore suitable for deployment in various applications such as backpacks/vests, handhelds, unmanned ground vehicles, and unmanned aircraft systems.

Modern unmanned sensor platforms, such as unmanned aerial vehicles (UAVs), remotely operated underwater vehicles (ROVs), unmanned (water) surface vehicles (USVs), and unmanned ground vehicles (UGVs) are able to operate over long distances and in all environments. Such systems typically rely on a portable power source that can limit their range of travel. Embodiments described herein provide relatively lightweight radiation source localization systems that typically increase the achievable range of such unmanned sensor platforms, which can be particularly helpful when attempting to localize a number of radiation sources within a survey area relatively quickly.

In various embodiments, radiation source localization data generated by a directional radiation detector, according to embodiments described herein, may be transmitted to a base station, either in real-time or after a survey, which may be configured to combine the radiation source localization data with a map or floor plan of a survey area to present the radiation source localization data in a radiation source map, such as a heat map, that specifies radiation source data (e.g., spectrum, estimated concentration, estimated dose rate, and/or other characteristics) over the spatial extents of the map or floor plan. Such map or floor plan may be two or three dimensional. The radiation source map may be stored at the base station and, if the base station includes a display, be presented in real time as a graphically overlaid map to an operator/user. During operation, such map may provide insight for positioning the unmanned sensor platform for stationary observation, for example, or, if operation is to be undertaken in the same area at a future time, such map may provide information for route planning of future operations.

FIG. 1 illustrates a block diagram of radiation source localization system 100 in accordance with an embodiment of the disclosure. In some embodiments, system 100 may be configured to fly over a scene, through a structure, or approach a target and image or sense the scene, structure, or target, or portions thereof, using gimbal system 122 to aim imaging system/sensor payload 140 and/or radiation sensor cradle 128 to aim directional radiation detector 160 at the scene, structure, or target, or portions thereof. Resulting imagery and/or other sensor data may be processed (e.g., by sensor payload 140, platform 110, and/or base station 130) and displayed to a user through use of user interface 132 (e.g., one or more displays such as a multi-function display (MFD), a portable electronic device such as a tablet, laptop, or smart phone, or other appropriate interface) and/or stored in memory for later viewing and/or analysis. In some embodiments, system 100 may be configured to use such imagery and/or sensor data to control operation of platform 110, sensor payload 140, and/or directional radiation detector 160, as described herein, such as controlling gimbal system 122 to aim sensor payload 140 towards a particular direction or controlling propulsion system 124 to move and/or orient platform 110 to a desired position/orientation in a scene or structure or relative to a target.

In additional embodiments, system 100 may be configured to use platform 110 and/or radiation sensor cradle 128 to position and/or orient directional radiation detector 160 at or relative to the scene, structure, or target, or portions thereof. Resulting directional radiation sensor data may be processed (e.g., by directional radiation detector 160, platform 110, and/or base station 130) and displayed to a user through use of user interface 132 (e.g., one or more displays such as a multi-function display (MFD), a portable electronic device such as a tablet, laptop, or smart phone, or other appropriate interface) and/or stored in memory for later viewing and/or analysis. In some embodiments, system 100 may be configured to use such imagery and/or sensor data to control operation of platform 110 and/or directional radiation detector 160, as described herein, such as controlling propulsion system 124 to move and/or orient platform 110 to a desired position in a scene or structure or relative to a target.

In the embodiment shown in FIG. 1, radiation source localization system 100 includes platform 110, optional base station 130, and at least one directional radiation detector 160. Platform 110 may be a mobile platform configured to move or fly and position directional radiation detector 160 (e.g., relative to a designated or detected target). As shown in FIG. 1, platform 110 may include one or more of a controller 112, an orientation sensor 114, a gyroscope/accelerometer 116, a global navigation satellite system (GNSS) 118, a communications module 120, a gimbal system 122, a propulsion system 124, a detector cradle 128, and other modules 126. Operation of platform 110 may be substantially autonomous and/or partially or completely controlled by optional base station 130, which may include one or more of a user interface 132, a communications module 134, and other modules 136. In other embodiments, platform 110 may include one or more of the elements of base station 130, such as with various types of manned aircraft, terrestrial vehicles, and/or surface or subsurface watercraft. In alternative embodiments, platform 110 may be implemented by a mobile human operator carrying and/or manipulating directional radiation detector 160 and/or various other elements or combinations elements of system 100 and/or platform 110, as shown.

Sensor payload 140 and/or directional radiation detector 160 may be physically coupled to platform 110 and be configured to capture sensor data (e.g., visible spectrum images, infrared images, narrow aperture radar data, analyte sensor data, and/or other sensor data) of a target position, area, and/or object(s) as selected and/or framed by operation of platform 110 and/or base station 130. In some embodiments, one or more of the elements of system 100 may be implemented in a combined housing or structure that can be coupled to or within platform 110 and/or held or carried by a user of system 100.

Controller 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of platform 110 and/or other elements of system 100, for example. Such software instructions may also implement methods for processing infrared images and/or other sensor signals, determining sensor information, providing user feedback (e.g., through user interface 132), querying devices for operational parameters, selecting operational parameters for devices, or performing any of the various operations described herein (e.g., operations performed by logic devices of various devices of system 100).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a user using user interface 132. In some embodiments, controller 112 may be integrated with one or more other elements of platform 110, for example, or distributed as multiple logic devices within platform 110, base station 130, and/or sensor payload 140.

In some embodiments, controller 112 may be configured to substantially continuously monitor and/or store the status of and/or sensor data provided by one or more elements of platform 110, sensor payload 140, directional radiation detector 160, and/or base station 130, such as the position and/or orientation of platform 110, sensor payload 140, and/or base station 130, for example, and the status of a communication link established between platform 110, sensor payload 140, directional radiation detector 160, and/or base station 130. Such communication links may be configured to be established and then transmit data between elements of system 100 substantially continuously throughout operation of system 100, where such data includes various types of sensor data, control parameters, and/or other data.

Orientation sensor 114 may be implemented as one or more of a compass, float, accelerometer, and/or other device capable of measuring an orientation of platform 110 (e.g., magnitude and direction of roll, pitch, and/or yaw, relative to one or more reference orientations such as gravity and/or Magnetic North), gimbal system 122, imaging system/sensor payload 140, and/or other elements of system 100, and providing such measurements as sensor signals and/or data that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of platform 110 and/or other elements of system 100 and providing such measurements as sensor signals and/or data that may be communicated to other devices of system 100 (e.g., user interface 132, controller 112).

GNSS 118 may be implemented according to any global navigation satellite system, including a GPS, GLONASS, and/or Galileo based receiver and/or other device capable of determining absolute and/or relative position of platform 110 (e.g., or an element of platform 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100. In some embodiments, GNSS 118 may include an altimeter, for example, or may be used to provide an absolute altitude.

Communications module 120 may be implemented as any wired and/or wireless communications module configured to transmit and receive analog and/or digital signals between elements of system 100. For example, communications module 120 may be configured to receive flight control signals and/or data from base station 130 and provide them to controller 112 and/or propulsion system 124. In other embodiments, communications module 120 may be configured to receive images and/or other sensor information (e.g., visible spectrum and/or infrared still images or video images) from sensor payload 140 and relay the sensor data to controller 112 and/or base station 130. In further embodiments, communications module 120 may be configured to receive radiation source localization data and/or other sensor information from directional radiation detector 160 and relay the sensor data to controller 112 and/or base station 130. In some embodiments, communications module 120 may be configured to support spread spectrum transmissions, for example, and/or multiple simultaneous communications channels between elements of system 100. Wireless communication links may include one or more analog and/or digital radio communication links, such as WiFi and others, as described herein, and may be direct communication links established between elements of system 100, for example, or may be relayed through one or more wireless relay stations configured to receive and retransmit wireless communications.

In some embodiments, communications module 120 may be configured to monitor the status of a communication link established between platform 110, sensor payload 140, and/or base station 130. Such status information may be provided to controller 112, for example, or transmitted to other elements of system 100 for monitoring, storage, or further processing, as described herein. Communication links established by communications module 120 may be configured to transmit data between elements of system 100 substantially continuously throughout operation of system 100, where such data includes various types of sensor data, control parameters, and/or other data, as described herein.

In some embodiments, gimbal system 122 may be implemented as an actuated gimbal mount, for example, that may be controlled by controller 112 to stabilize sensor payload 140 relative to a target or to aim sensor payload 140 according to a desired direction and/or relative position. As such, gimbal system 122 may be configured to provide a relative orientation of sensor payload 140 (e.g., relative to an orientation of platform 110) to controller 112 and/or communications module 120 (e.g., gimbal system 122 may include its own orientation sensor 114). In other embodiments, gimbal system 122 may be implemented as a gravity driven mount (e.g., non-actuated). In various embodiments, gimbal system 122 may be configured to provide power, support wired communications, and/or otherwise facilitate operation of articulated sensor/sensor payload 140. In further embodiments, gimbal system 122 may be configured to couple to a laser pointer, range finder, and/or other device, for example, to support, stabilize, power, and/or aim multiple devices (e.g., sensor payload 140 and one or more other devices) substantially simultaneously.

Propulsion system 124 may be implemented as one or more propellers, turbines, or other thrust-based propulsion systems, and/or other types of propulsion systems that can be used to provide motive force and/or lift to platform 110 and/or to steer platform 110. In some embodiments, propulsion system 124 may include multiple propellers (e.g., a tri, quad, hex, oct, or other type "copter") that can be controlled (e.g., by controller 112) to provide lift and motion for platform 110 and to provide an orientation for platform 110. In other embodiments, propulsion system 110 may be configured primarily to provide thrust while other structures of platform 110 provide lift, such as in a fixed wing embodiment (e.g., where wings provide the lift) and/or an aerostat embodiment (e.g., balloons, airships, hybrid aerostats). In various embodiments, propulsion system 124 may be implemented with a portable power supply, such as a battery and/or a combustion engine/generator and fuel supply.

Other modules 126 may include other and/or additional sensors, actuators, communications modules/nodes, and/or user interface devices, for example, and may be used to provide additional environmental information related to operation of platform 110, for example. In some embodiments, other modules 126 may include a humidity sensor, a wind and/or water temperature sensor, a barometer, an altimeter, an analyte detection system, a radar system, a proximity sensor, a visible spectrum camera or infrared camera (with an additional mount), an irradiance detector, and/or other environmental sensors providing measurements and/or other sensor signals that can be displayed to a user and/or used by other devices of system 100 (e.g., controller 112) to provide operational control of platform 110 and/or system 100.

In some embodiments, other modules 126 may include one or more actuated and/or articulated devices (e.g., multispectrum active illuminators, visible and/or IR cameras, radars, sonars, and/or other actuated devices) coupled to platform 110, where each actuated device includes one or more actuators adapted to adjust an orientation of the device, relative to platform 110, in response to one or more control signals (e.g., provided by controller 112). In particular, other modules 126 may include a stereo vision system configured to provide image data that may be used to calculate or estimate a position of platform 110, for example, or to calculate or estimate a relative position of a navigational hazard in proximity to platform 110. In various embodiments, controller 130 may be configured to use such proximity and/or position information to help safely pilot platform 110 and/or monitor communication link quality, as described herein.

In various embodiments, detector cradle 128 may be implemented as a latching mechanism that may be permanently mounted to platform 110 to provide a mounting position and/or orientation for directional radiation detector 160 relative to a center of gravity of platform 110, relative to propulsion system 124, and/or relative to other elements of platform 110. In addition, detector cradle 128 may be configured to provide power, support wired communications, and/or otherwise facilitate operation of directional radiation detector 160, as described herein. As such, detector cradle 128 may be configured to provide a power, telemetry, and/or other sensor data interface between platform 110 and directional radiation detector 160.

In some embodiments, detector cradle 128 may be implemented as an actuated gimbal mount, for example, that may be controlled by controller 112 to stabilize directional radiation detector 160 relative to a target or to aim directional radiation detector 160 according to a desired direction and/or relative position. As such, detector cradle 128 may be configured to provide a relative orientation of directional radiation detector 160 (e.g., relative to an orientation of platform 110) to controller 112 and/or communications module 120 (e.g., detector cradle 128 may include its own orientation sensor 114). In other embodiments, detector cradle 128 may be implemented as a gravity driven mount (e.g., non-actuated). In further embodiments, detector cradle 128 may be configured to couple to a laser pointer, range finder, and/or other device, for example, to support, stabilize, power, and/or aim multiple devices (e.g., directional radiation detector 160 and one or more other devices) substantially simultaneously.

User interface 132 of base station 130 may be implemented as one or more of a display, a touch screen, a keyboard, a mouse, a joystick, a knob, a steering wheel, a yoke, and/or any other device capable of accepting user input and/or providing feedback to a user. In various embodiments, user interface 132 may be adapted to provide user input (e.g., as a type of signal and/or sensor information transmitted by communications module 134 of base station 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of platform 110 and/or other elements of system 100. For example, user interface 132 may be adapted to display a time series of positions, headings, and/or orientations of platform 110 and/or other elements of system 100 overlaid on a geographical map, which may include one or more graphs indicating a corresponding time series of actuator control signals, sensor information, and/or other sensor and/or control signals.

In some embodiments, user interface 132 may be adapted to accept user input including a user-defined target heading, waypoint, route, and/or orientation for an element of system 100, for example, and to generate control signals to cause platform 110 to move according to the target heading, route, and/or orientation, or to aim sensor payload 140 or directional radiation detector 160 accordingly. In other embodiments, user interface 132 may be adapted to accept user input modifying a control loop parameter of controller 112, for example.

In further embodiments, user interface 132 may be adapted to accept user input including a user-defined target attitude, orientation, and/or position for an actuated or articulated device (e.g., sensor payload 140 or directional radiation detector 160) associated with platform 110, for example, and to generate control signals for adjusting an orientation and/or position of the actuated device according to the target attitude, orientation, and/or position. Such control signals may be transmitted to controller 112 (e.g., using communications modules 134 and 120), which may then control platform 110 accordingly.

Communications module 134 may be implemented as any wired and/or wireless communications module configured to transmit and receive analog and/or digital signals between elements of system 100. For example, communications module 134 may be configured to transmit flight control signals from user interface 132 to communications module 120 or 144. In other embodiments, communications module 134 may be configured to receive sensor data (e.g., visible spectrum and/or infrared still images or video images, or other sensor data) from sensor payload 140. In some embodiments, communications module 134 may be configured to support spread spectrum transmissions, for example, and/or multiple simultaneous communications channels between elements of system 100. In various embodiments, communications module 134 may be configured to monitor the status of a communication link established between base station 130, sensor payload 140, and/or platform 110 (e.g., including packet loss of transmitted and received data between elements of system 100, such as with digital communication links), as described herein. Such status information may be provided to user interface 132, for example, or transmitted to other elements of system 100 for monitoring, storage, or further processing, as described herein.

Other modules 136 of base station 130 may include other and/or additional sensors, actuators, communications modules/nodes, and/or user interface devices used to provide additional environmental information associated with base station 130, for example. In some embodiments, other modules 136 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by other devices of system 100 (e.g., controller 112) to provide operational control of platform 110 and/or system 100 or to process sensor data to compensate for environmental conditions, such as an water content in the atmosphere approximately at the same altitude and/or within the same area as platform 110 and/or base station 130, for example. In some embodiments, other modules 136 may include one or more actuated and/or articulated devices (e.g., multi-spectrum active illuminators, visible and/or IR cameras, radars, sonars, and/or other actuated devices), where each actuated device includes one or more actuators adapted to adjust an orientation of the device in response to one or more control signals (e.g., provided by user interface 132).

In embodiments where imaging system/sensor payload 140 is implemented as an imaging device, imaging system/sensor payload 140 may include imaging module 142, which may be implemented as a cooled and/or uncooled array of detector elements, such as visible spectrum and/or infrared sensitive detector elements, including quantum well infrared photodetector elements, bolometer or microbolometer based detector elements, type II superlattice based detector elements, and/or other infrared spectrum detector elements that can be arranged in a focal plane array. In various embodiments, imaging module 142 may include one or more logic devices (e.g., similar to controller 112) that can be configured to process imagery captured by detector elements of imaging module 142 before providing the imagery to memory 146 or communications module 144. More generally, imaging module 142 may be configured to perform any of the operations or methods described herein, at least in part, or in combination with controller 112 and/or user interface 132.

In some embodiments, sensor payload 140 may be implemented with a second or additional imaging modules similar to imaging module 142, for example, that may include detector elements configured to detect other electromagnetic spectrums, such as visible light, ultraviolet, and/or other electromagnetic spectrums or subsets of such spectrums. In various embodiments, such additional imaging modules may be calibrated or registered to imaging module 142 such that images captured by each imaging module occupy a known and at least partially overlapping field of view of the other imaging modules, thereby allowing different spectrum images to be geometrically registered to each other (e.g., by scaling and/or positioning). In some embodiments, different spectrum images may be registered to each other using pattern recognition processing in addition or as an alternative to reliance on a known overlapping field of view.

Communications module 144 of sensor payload 140 may be implemented as any wired and/or wireless communications module configured to transmit and receive analog and/or digital signals between elements of system 100. For example, communications module 144 may be configured to transmit infrared images from imaging module 142 to communications module 120 or 134. In other embodiments, communications module 144 may be configured to receive control signals (e.g., control signals directing capture, focus, selective filtering, and/or other operation of sensor payload 140) from controller 112 and/or user interface 132. In some embodiments, communications module 144 may be configured to support spread spectrum transmissions, for example, and/or multiple simultaneous communications channels between elements of system 100. In various embodiments, communications module 144 may be configured to monitor the status of a communication link established between sensor payload 140, base station 130, and/or platform 110 (e.g., including packet loss of transmitted and received data between elements of system 100, such as with digital communication links), as described herein. Such status information may be provided to imaging module 142, for example, or transmitted to other elements of system 100 for monitoring, storage, or further processing, as described herein.

Memory 146 may be implemented as one or more machine readable mediums and/or logic devices configured to store software instructions, sensor signals, control signals, operational parameters, calibration parameters, infrared images, and/or other data facilitating operation of system 100, for example, and provide it to various elements of system 100. Memory 146 may also be implemented, at least in part, as removable memory, such as a secure digital memory card for example including an interface for such memory.

Orientation sensor 148 of sensor payload 140 may be implemented similar to orientation sensor 114 or gyroscope/accelerometer 116, and/or any other device capable of measuring an orientation of sensor payload 140, imaging module 142, and/or other elements of sensor payload 140 (e.g., magnitude and direction of roll, pitch, and/or yaw, relative to one or more reference orientations such as gravity and/or Magnetic North) and providing such measurements as sensor signals that may be communicated to various devices of system 100. Gyroscope/accelerometer (e.g., angular motion sensor) 150 of sensor payload 140 may be implemented as one or more electronic sextants, semiconductor devices, integrated chips, accelerometer sensors, accelerometer sensor systems, or other devices capable of measuring angular velocities/accelerations (e.g., angular motion) and/or linear accelerations (e.g., direction and magnitude) of sensor payload 140 and/or various elements of sensor payload 140 and providing such measurements as sensor signals that may be communicated to various devices of system 100.

Other modules 152 of sensor payload 140 may include other and/or additional sensors, actuators, communications modules/nodes, cooled or uncooled optical filters, and/or user interface devices used to provide additional environmental information associated with sensor payload 140, for example. In some embodiments, other modules 152 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by imaging module 142 or other devices of system 100 (e.g., controller 112) to provide operational control of platform 110 and/or system 100 or to process imagery to compensate for environmental conditions.

In various embodiments, directional radiation detector/sensor payload 160 may be implemented as a directional radiation detector configured to detect radiation sources in the environment surrounding platform 110. In the embodiment shown in FIG. 1, directional radiation detector 160 includes detector controller 162, memory 163, communications module 164, directional radiation sensor assembly 166, orientation and/or position sensor (OPS) 167, power supply 168, and other modules 170. In various embodiments, directional radiation sensor assembly 166 may be implemented with sensor elements configured to detect ionizing radiation proximate to platform 110 and/or directional radiation detector 160.

Detector controller 162 may be implemented as one or more of any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of directional radiation detector 160 and/or other elements of directional radiation detector 160, for example. Such software instructions may also implement methods for processing sensor signals, determining sensor information, providing user feedback (e.g., through user interface 132), querying devices for operational parameters, selecting operational parameters for devices, or performing any of the various operations described herein.

In addition, a non-transitory medium may be provided for storing machine readable instructions for loading into and execution by detector controller 162. In these and other embodiments, detector controller 162 may be implemented with other components where appropriate, such as volatile memory, non-volatile memory, one or more interfaces, and/or various analog and/or digital components for interfacing with modules of directional radiation detector 160 and/or devices of system 100. For example, detector controller 162 may be adapted to store sensor signals, sensor information, parameters for coordinate frame transformations, calibration parameters, sets of calibration points, and/or other operational parameters, over time, for example, and provide such stored data to a user using user interface 132. In some embodiments, detector controller 162 may be integrated with one or more other elements of directional radiation detector 160, for example, or distributed as multiple logic devices within platform 110, base station 130, and/or directional radiation detector 160.

In some embodiments, detector controller 162 may be configured to substantially continuously monitor and/or store the status of and/or sensor data provided by one or more elements of sensor assembly 166 of directional radiation detector 160, such as the position and/or orientation of platform 110, directional radiation detector 160, and/or base station 130, for example, and the status of a communication link established between platform 110, directional radiation detector 160, and/or base station 130. Such communication links may be configured to be established and then transmit data between elements of system 100 substantially continuously throughout operation of system 100, where such data includes various types of sensor data, control parameters, and/or other data.

Memory 163 may be implemented as one or more machine readable mediums and/or logic devices configured to store software instructions, sensor signals, control signals, operational parameters, calibration parameters, directional radiation sensor data, and/or other data facilitating operation of system 100, for example, and provide it to various elements of system 100. Memory 163 may also be implemented, at least in part, as removable memory, such as a secure digital memory card for example including an interface for such memory.

Communications module 164 of directional radiation detector 160 may be implemented as any wired and/or wireless communications module configured to transmit and receive analog and/or digital signals between elements of system 100. For example, communications module 164 may be configured to transmit directional radiation sensor data from directional radiation detector 160 and/or directional radiation sensor assembly 166 to communications module 120 of platform 110 (e.g., for further transmission to base station 130) or directly to communications module 134 of base station 130. In other embodiments, communications module 164 may be configured to receive control signals (e.g., control signals directing operation of directional radiation detector 160) from controller 112 and/or user interface 132. In some embodiments, communications module 164 may be configured to support spread spectrum transmissions, for example, and/or multiple simultaneous communications channels between elements of system 100.

Directional radiation sensor assembly 166 may be implemented as one or more sensor element supports (e.g., printed circuit boards "PCBs"), connectors, scintillators, photodetectors or photomultipliers (e.g., including silicon photomultipliers "SiPMs" and/or photomultiplier tubes "PMTs"), optical guides, shutters, foils, panels, and/or other modules configured to facilitate directional detection of ionizing radiation in the environment proximate to and/or otherwise associated with platform 110 and/or directional radiation detector 160.

Orientation and/or position sensor (OPS) 167 of directional radiation detector 160 may be implemented similar to orientation sensor 114, gyroscope/accelerometer 116, GNSS 118, and/or any other device capable of measuring an orientation and/or position of directional radiation detector 160, sensor assembly 166, and/or other elements of directional radiation detector 160 (e.g., magnitude and direction of roll, pitch, and/or yaw, relative to one or more reference orientations such as gravity and/or Magnetic North, along with an absolute or relative position) and providing such measurements as sensor signals that may be communicated to various devices of system 100.

Power supply 168 may be implemented as any power storage device configured to provide enough power to each sensor element of sensor assembly 166 to keep all such sensor elements active and able to detect ionizing radiation while directional radiation detector 160 is otherwise disconnected from external power (e.g., provided by platform 110 and/or base station 130). In various embodiments, power supply 168 may be implemented by a supercapacitor so as to be relatively lightweight and facilitate flight of platform 110 and/or relatively easy handheld operation of platform 110 (e.g., where platform 110 is implemented as a handheld sensor platform).

Other modules 170 of directional radiation detector 160 may include other and/or additional sensors, actuators, communications modules/nodes, and/or user interface devices used to provide additional environmental information associated with directional radiation detector 160, for example. In some embodiments, other modules 170 may include a humidity sensor, a wind and/or water temperature sensor, a barometer, a GNSS, and/or other environmental sensors providing measurements and/or other sensor signals that can be displayed to a user and/or used by detector controller 162 or other devices of system 100 (e.g., controller 112) to provide operational control of platform 110 and/or system 100 or to process directional radiation sensor data to compensate for environmental conditions, as described herein.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100.

In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements.

Each element of system 100 may include one or more batteries, capacitors, or other electrical power storage devices, for example, and may include one or more solar cell modules or other electrical power generating devices. In some embodiments, one or more of the devices may be powered by a power source for platform 110, using one or more power leads. Such power leads may also be used to support one or more communication techniques between elements of system 100.

Figure 2:
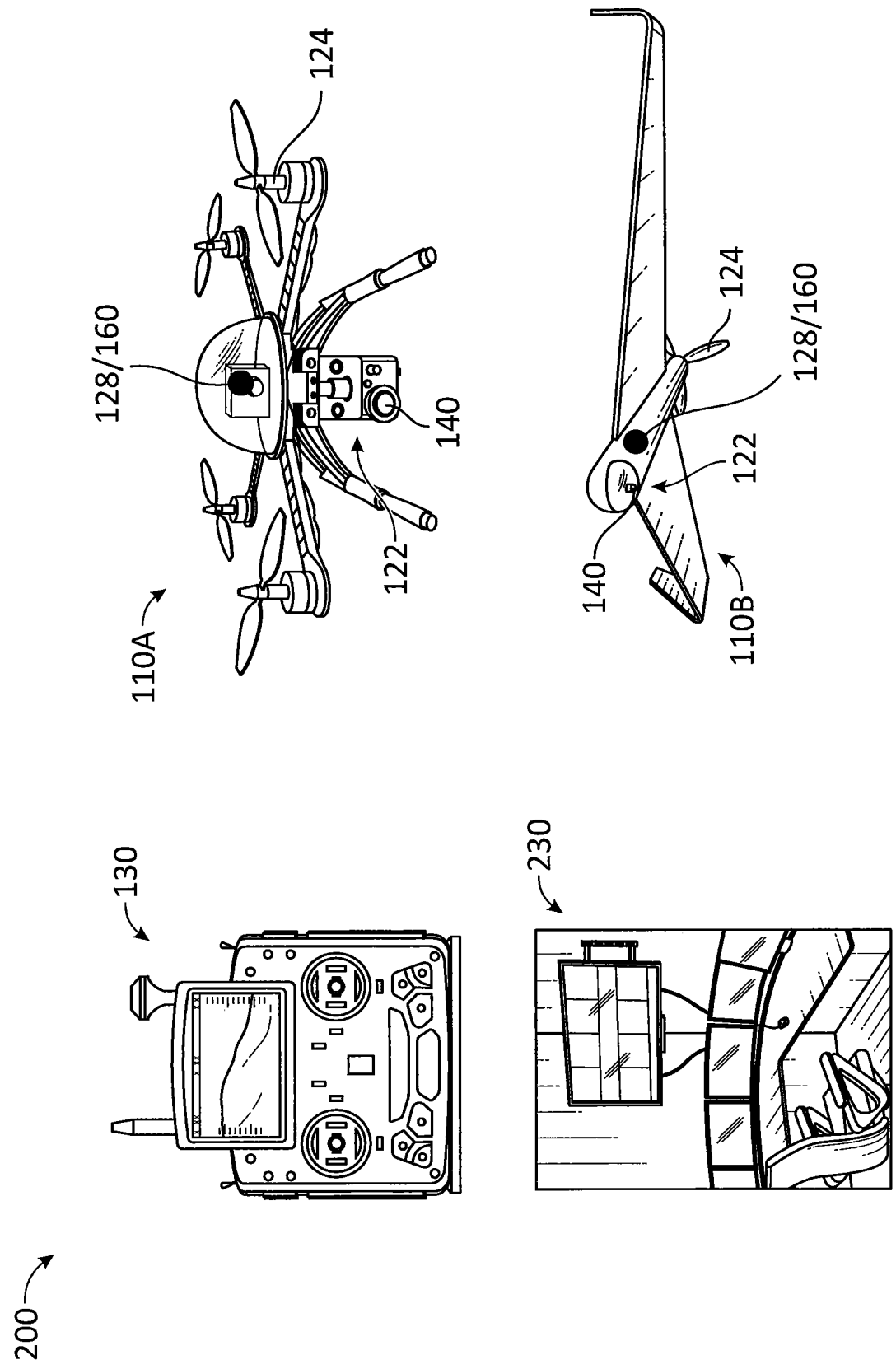
FIG. 2 illustrates a diagram of mobile platforms of a radiation source localization system in accordance with an embodiment of the disclosure.

FIG. 2 illustrates a diagram of mobile platforms 110A and 110B of radiation source localization system 200 including embodiments of directional radiation detector 160 and associated detector cradle 128 in accordance with an embodiment of the disclosure. In the embodiment shown in FIG. 2, radiation source localization system 200 includes base station 130, optional co-pilot station 230, mobile platform 110A with articulated imaging system/sensor payload 140, gimbal system 122, directional radiation detector 160, and detector cradle 128, and mobile platform 110B with articulated imaging system/sensor payload 140, gimbal system 122, directional radiation detector 160, and detector cradle 128, where base station 130 and/or optional co-pilot station 230 may be configured to control motion, position, orientation, and/or general operation of platform 110A, platform 110B, sensor payloads 140, and/or directional radiation detectors 160.

In various embodiments, co-pilot station 230 may be implemented similarly relative to base station 130, such as including similar elements and/or being capable of similar functionality. In some embodiments, co-pilot station 230 may include a number of displays so as to facilitate operation of directional radiation detector 160 and/or various imaging and/or sensor payloads of mobile platforms 110A-B, generally separate from piloting mobile platforms 110A-B, and to facilitate substantially real time analysis, visualization, and communication of sensor data and corresponding directives, such as to first responders in contact with a co-pilot or user of system 200. For example, base station 130 and co-pilot station 230 may each be configured to render any of the display views described herein. In additional embodiments, radiation source localization system 200 may include a variety of other types of mobile platforms, including humans carrying embodiments of directional radiation detector 160 by hand, backpack, or other harness system.

As noted herein, detecting and locating radioactive materials is crucial for stopping nuclear threats. Since the intensity of radiation decreases with the distance to the source, the count rate of a conventional detector can vary when the detector is not stationary. Such process provides a simple way for locating a radioactive source with a single detector assembly. However, it is necessary for a detector operator using such detector to follow a search pattern or move in a trial-and-error fashion to establish a field gradient in order for the instrument to estimate the direction of the source. That the intensity of radiation attenuates while traversing through matter can be useful for estimating the direction of a source.

Embodiments described herein reduce the size, weight, and power necessary to estimate a source direction by employing a relatively simple detector arrangement including two separate detectors separated by an attenuating planar collimating panel or absorber. Such arrangement may be extended or adapted to use more than two detectors, with each detector occluded from its neighbor detectors by one or more such attenuating planar collimating panels. Embodiments introduce such planar collimating panel to increase the effect of detector-detector occlusion (e.g., naturally occurring occlusion due to the materials used in each detector). In various embodiments, such planar collimating panel may be formed from a high-density metal plate made of materials such as tungsten, tantalum, lead, or stainless steel. In some embodiments, the weight of the planar collimating panel may be equal to or less than one quarter of the weight of a single detector. However, particularly with more compact directional radiation detectors (e.g., overall smaller assemblies) and/or where higher angular sensitivity is required, the weight ratio of the planar collimating panel to single detector may be greater than 1:4, such as approximately 1:1, for example, or between 1:4 and 4:1 or 1:1 and 4:1. With the planar collimating panel installed, the direction of sources at relatively small angles can be estimated.

Figure 3:
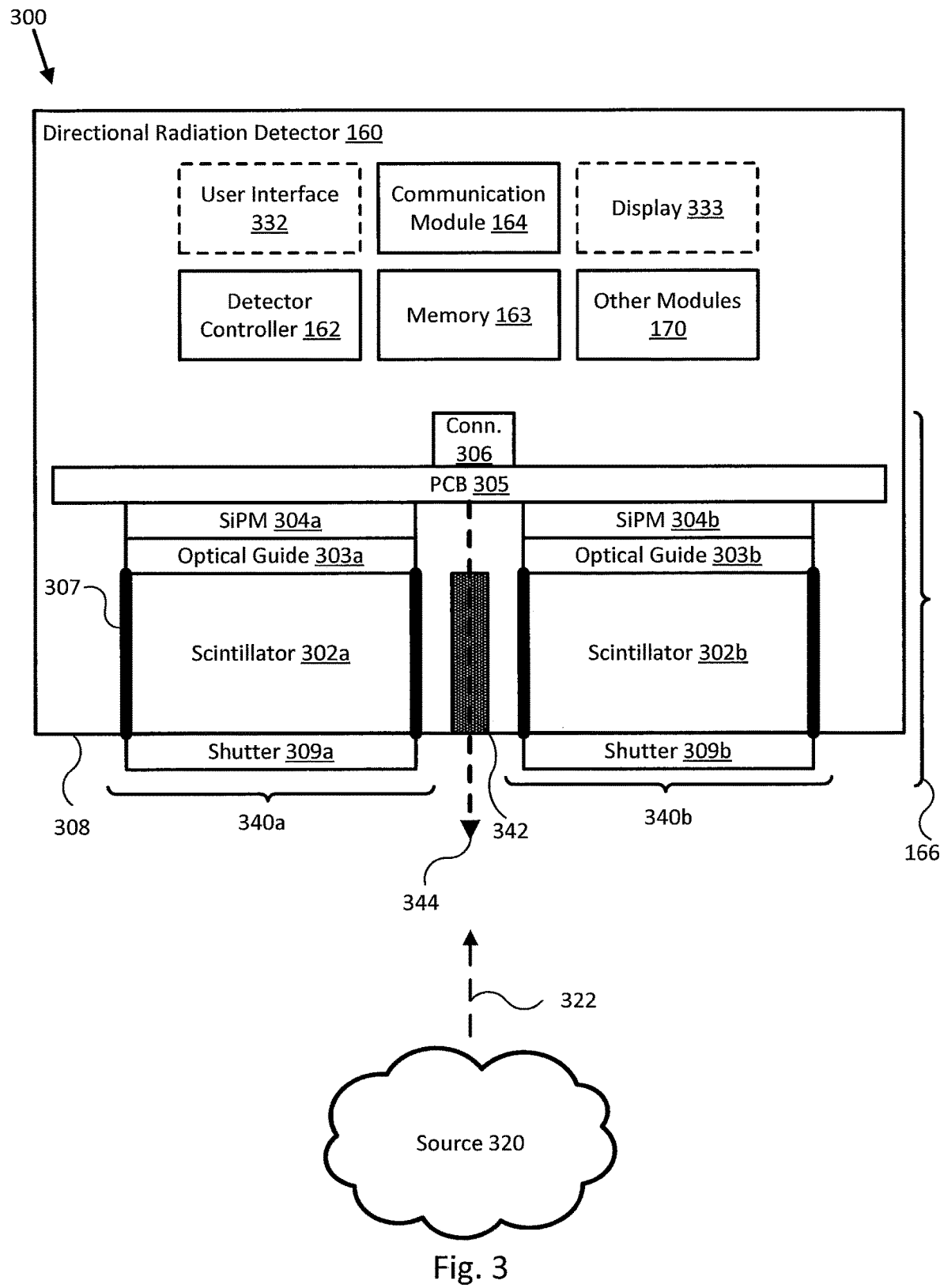
FIG. 3 illustrates a diagram of a directional radiation detector for a radiation source localization system in accordance with an embodiment of the disclosure.

FIG. 3 illustrates a diagram of directional radiation detector 160 for radiation source localization system 100 in accordance with an embodiment of the disclosure. In FIG. 3, directional radiation detector 160 includes first and second radiation detectors 340a-b including respective scintillators 302a-b separated from each other by planar collimating panel 342 and sensed by respective SiPMs 304a-b coupled to common PCB 305. As described herein, by separating the two radiation detectors 340a-b using planar collimating panel 342, the directionality of ionizing radiation 322 generated by radiation source 320 is enhanced without significantly reducing detector sensitivity, which allows for relatively quick source localization (e.g., two dimensional instantaneous source localization) using relatively inexpensive and reduced weight detectors as well as using simple detection event processing techniques, as described herein.

In various embodiments, first and second radiation detectors 340a-b may be aligned to sensor axis 344 of directional radiation detector 160 and/or directional radiation sensor assembly 166, as shown (e.g., roughly in the direction of the center of the field of view of each radiation detector's photomultiplier element(s), such as a PMT or an SiPM, as described herein). In the embodiment depicted by FIG. 3, first and second radiation detectors 340a-b are implemented with respective first and second scintillators 302a-b that are separated from each other, along a direction perpendicular to sensor axis 344, by planar collimating panel 342 (e.g., shown edge-on in FIG. 3). In general, planar collimating panel 342 may be disposed between first and second radiation detectors 340a-b so as to be coplanar with sensor axis 344, as shown. In some embodiments, first and second scintillators 302a-b may be bonded directly to opposing surfaces of planar collimating panel 342.

In some embodiments, planar collimating panel 342 may be coupled to or through PCB 305 and/or housing 308 to fully occlude first radiation detector 340a from second radiation detector 340b. In other embodiments, planar collimating panel 342 may be sized to fully occlude at least first scintillator 302a of first radiation detector 340a from second scintillator 302b of second radiation detector 340b, for example, so as to minimize weight and size of planar collimating panel 342. Planar collimating panel 342 may be formed from tungsten, lead, stainless steel, and/or other metal material or alloy able to attenuate at least gamma radiation sufficiently at a desired thickness, weight, and/or acceptable toxicity (e.g., lead shields may be subject to various regulatory limitations) associated with directional radiation detector 160.

As shown in FIG. 3, directional radiation detector 160 may be implemented with SiPMs 304a-b supported by PCB 105 along with a variety of components adapted to detect ionizing radiation 322 produced by source 320 and report directional radiation sensor data to other elements of system 100 as described herein. In some embodiments, system 300 may report directional radiation sensor data by aggregating or directional radiation sensor data to provide an accumulated dosage, spectrograph, or material identification of radiation detected by system 300, and then transmitting the directional radiation sensor data to other elements of system 100. In other embodiments, system 300 may report directional radiation sensor data by energizing an LED indicator and/or transmitting an alert or notification signal to a component (e.g., an alarm, or an electrical switch or relay) of a notification system.

In the embodiment shown in FIG. 3, sensor assembly 166 of directional radiation detector 160 includes first and second radiation detectors 340a-b implemented with respective scintillators 302a-b and SiPMs 304a-b coupled to PCB 105. As described more fully herein, scintillators 302a-b may be implemented with a variety of structures and materials adapted to interact with ionizing radiation 322 to produce photons that may, in-turn, be detected (e.g., converted to electrical signals) by respective SiPMs 304a-b. Alternatively, scintillators 302a-b may be replaced by other detector materials that are able to interact with ionizing radiation, such as semiconductor detectors (e.g., HPGe and/or CZT), for example, or other ionizing radiation detector material types. Moreover, scintillators 302a-b may be cubic, rectangular, or cylindrically shaped, for example, and may be bonded directed to planar collimating panel 342.

In various embodiments, SiPMs 304a-b may be implemented as any silicon-based pixelated semiconductor devices adapted to convert photons (e.g., with wavelengths corresponding to those emitted by scintillators 302a-b) entering SiPM pixels into per-pixel electrical signals, as described herein. In alternative embodiments, SiPMs 304a-b may be implemented as non-pixelated photodetectors to reduce processing and/or electrical complexity and/or cost, such as PMT based photodetectors or non-pixelated or reduced pixel count SiPMs. PCB 305 may be a conventional printed circuit board, for example, and be adapted to provide electrical access to SiPMs 304a-b (e.g., through various metal traces and/or connector 306) as well as physical support for SiPMs 304a-b and/or scintillators 302a-b. In alternative embodiments, SiPMs 304a-b may be replaced with photomultiplier tubes and PCB 305 may be adapted to provide electrical access to as well as physical support for such photomultiplier tubes. Connector 306 may be implemented as a relatively small (e.g., relative to a connector used to access a photomultiplier tube "PMT") electrical connector adapted to support analog and/or digital coupling to PCB 305.

Optionally, directional radiation detector 300 may include a variety of components adapted to facilitate operation of and electrical access to SiPMs 304a-b. For example, directional radiation detector 160 may include optical guides 303a-b and/or reflectors 307 to guide photons generated within scintillators 302a-b (e.g., scintillator photons) to an interfacing surface of SiPMs 304a-b. In various embodiments, optical guides 303a-b may be adapted to compensate for surface mismatch between scintillators 302a-b and SiPMs 304a-b, and reflectors 307 may be adapted to reflect scintillator photons towards SiPMs 304a-b. In some embodiments, reflectors 307 may alternatively or additionally be disposed across a source-side surface of scintillators 302a-b, for example, and/or be extended or otherwise adapted to block external photons from entering scintillators 302a-b and/or reaching SiPMs 304a-b.

As shown in FIG. 3, directional radiation detector 160 may optionally include shutters 309a-b and a variety of electrical and/or electronic components coupled to and/or supported by PCB 305 and/or housing 308. In some embodiments, shutters 309a-b may be implemented as mechanical or removable radiation shields adapted to selectively block or substantially reduce one or more components of ionizing radiation 322. For example, shutters 309a-b may be implemented with a high-Z material capable of substantially blocking alpha, beta, and relatively low energy gamma radiation from entering scintillators 302a-b but allowing neutron and/or high energy gamma radiation. In various embodiments, shutters 309a-b may be actuated (e.g., opened and/or closed) electronically by detector controller 162, for example. Shutters 309a-b may be coupled to/supported by housing 308, for example, and housing 308 may be adapted to provide similar or differentiated radiation shielding relative to shutters 309a-b. In some embodiments, shutters 309a-b and/or housing 308 may be implemented, at least in part, using lead and/or tungsten panels, foil, and/or other structures, as described herein. In some embodiments, housing 308 may be adapted to protect system 300 from environmental conditions associated with space or atmospheric flight, and/or other outdoor environmental conditions, such as stationary or articulated mounting on a terrestrial structure, for example. In other embodiments, housing 308 may be adapted for handheld use.

In some embodiments, directional radiation detector 160 may be implemented with three radiation detectors 340 (e.g., a, b, c), with one radiation detector 340 displaced orthogonally to and separated from the plane in which radiation detectors 340a,b are disposed, by an additional planar collimating plate oriented orthogonal to planar collimating plate 342, such as in an "L" shape, in order to provide three dimensional instantaneous source localization and/or characterization of the directionality of ionizing radiation 322 generated by radiation source 320, using pairwise accumulation ratios (e.g., a-b, b-c, and/or a-c) and/or other techniques similar to those disclosed herein. In further embodiments, directional radiation detector 160 may be implemented with four radiation detectors 340 (e.g., a, b, c, d) arranged in a 2×2 array and similarly configured to provide three dimensional instantaneous source localization and/or characterization of the directionality of ionizing radiation 322 generated by radiation source 320, using pairwise accumulation ratios (e.g., a-b, a-c, a-d, b-c, b-d, and/or c-d) and/or other techniques similar to those disclosed herein.

Each of detector controller 162, memory 163, user interface 332, communications module 164, display 333, and other modules 170, if optionally included in directional radiation detector 160, may be coupled to PCB 305 or to housing 308, for example, depending on a desired application and/or overall size of scintillators 302a-b, SiPMs 304a-b, PCB 305, and/or connector 306 (e.g., a detector assembly). In other embodiments, any one or group of such components may be implemented externally to directional radiation detector 160, for example, and/or in a distributed or grouped manner (e.g., multiple detector controllers 162 operating directional radiation detector 160, or multiple detectors 160 operated by a single detector controller 162).

In some embodiments, detector controller 162 may be implemented as any appropriate processing device (e.g., microcontroller, processor, application specific integrated circuit (ASIC), field programmable gate array (FPGA), or other logic device) that may be used by system 300 to execute appropriate instructions, such as software instructions and/or signal processing operations for detecting radiation using scintillators 302a-b and SiPMs 304a-b. Further, detector controller 162 may be implemented with various signal processing devices, such as analog to digital converters (ADCs), trigger inputs, timing circuitry, and other signal processing devices as described herein.

In various embodiments, at least some portion or some functionality of detector controller 162 may be part of or implemented with other existing controllers or logic devices of separate systems, such as a server, a personal electronic device (e.g., a mobile phone, smartphone, tablet device, laptop computer, desktop computer), and/or any other device that may be used to process, report, or act on radiation detected by system 300. In other embodiments, detector controller 162 may be adapted to interface and communicate with various external controllers or logic devices and associated components and/or perform various operations in a distributed manner.

In general, detector controller 162 may be adapted to interface and communicate with other components of system 300 to perform the methods and processes described herein. For example, detector controller 162 may be adapted to perform gross counting operations, spectrometry, or stabilization/calibration methods described herein. In one embodiment, detector controller 162 may be adapted to use communications module 164 to report radiation detection to display 333 and render and/or display a dose amount or an alert notification, for example, or render and/or display an image of a spectrographic map. In another embodiment, detector controller 162 may be adapted to use communications module 164 to establish a wired or wireless communication link with a remote reporting system, for example, and report counts, energies, transient characteristics, and/or other characteristics of detected radiation.

Memory 163 is typically in communication with at least detector controller 162 and may include one or more memory devices (e.g., memory components) to store information, including radiation detection data, calibration data, other types of sensor data, and/or software instructions. Such memory devices may include various types of volatile and non-volatile information storage devices, such as RAM (Random Access Memory), ROM (Read-Only Memory), EEPROM (Electrically-Erasable Read-Only Memory), flash memory, a disk drive, and/or other types of memory. In one embodiment, memory 163 may include a portable memory device that can be removed from system 300 and used to convey stored data to other systems for further processing and inspection.

Communications module 164 may be configured to facilitate communication and interfacing between various components of system 300 (e.g., between detector controller 162 and memory 163 and/or display 333) and/or various external devices, such as a wireless access point, a personal electronic device, a server, and/or other detectors. For example, components such as user interface 332 and display 333 may transmit and receive data to and from detector controller 162 through communications module 164, which may be adapted to manage wired and/or wireless communication links between the various components. As such, communications module 164 may support various interfaces, protocols, and standards for local system networking, such as the controller area network (CAN) bus, the local interconnect network (LIN) bus, the media oriented systems transport (MOST) network, or the ISO 11738 (or ISO bus) standard.

In some embodiments, detector controller 162 may be adapted to communicate, via communications module 164, with a remote user interface, a notification system, or other detection systems to, for example, aggregate reports from multiple systems or sensors and/or implement a particular detection and/or notification method. As such, communications module 164 may include a wireless communication component (e.g., based on the IEEE 802.11 WiFi standards, the Bluetooth™ standard, the ZigBee™ standard, or other appropriate short range wireless communication standards), a wireless broadband component (e.g., based on WiMax technologies), a mobile cellular component, a wireless satellite component, or other appropriate wireless communication components. Communications module 164 may also be configured to interface with a wired network and/or device via a wired communication component, such as an Ethernet interface.

If present, user interface 332 provides for user interaction with directional radiation detector 160 and may include one or more buttons, indicators (e.g., LEDs), keyboards, trackballs, knobs, joysticks, displays (e.g., a liquid crystal display, a touch-screen display), and/or other type of user interface adapted to accept user input and/or provide user feedback. In one embodiment, user interface 332 may include a power button, a vibration motor, an LED to indicate a radiation detection event (e.g., a count), and/or a speaker to provide an audible indication of a detection event (e.g., visible, tactile, and/or audible indicators). In various embodiments, user interface 332 may be used to input a variety of system configuration settings, such as stabilization/calibration parameters, as described herein. In some embodiments, user interface 332 may be used to view one or more reports, graphs, and/or other radiation detection data captured by system 300 and/or processed according to the various operations described herein.

If present, display 333 may be configured to present, indicate, or otherwise convey alerts, notifications, counts, dose rates, and/or other reports of radiation detection (e.g., generated by detector controller 162). Display 333 may be implemented with an electronic display screen, such as a liquid crystal display (LCD), a cathode ray tube (CRT), or various other types of generally known video displays and monitors, including touch-sensitive displays. Display 333 may be suitable for presenting radiation detection data, graphs, images, reports, or other information as described herein.

Other modules 170 may include various stabilization/calibration devices such as a temperature sensor/probe (e.g., a thermocouple, an infrared thermometer), an LED or laser diode (e.g., to provide a known photon source), an ambient light sensor, a voltage regulator and/or filter, a variable voltage source, and/or other types of devices that can be used to facilitate stabilization or calibration, as described herein. Sensor data from such sensors may be utilized by detector controller 162 to detect stabilization/calibration parameters related to directional radiation detector 160, and thereby produce more reliable reports of detecting radiation. In some embodiments, other modules 170 may include a GPS, accelerometer, compass, OPS 167, and/or other orientation and/or position sensor capable of sensing a position and/or orientation of PCB 305 and/or directional radiation detector 160, such as when similar orientation and/or position sensor data isn't available through platform 110. Other modules 170 may additionally include a power module implemented as a battery, a power adapter, a charging circuit, a power interface, a power monitor, and/or other type of power supply providing a stationary or mobile power source. In some embodiments, the power module may be adapted to provide uninterruptible power and/or power conditioning to protect continued operation of directional radiation detector 160.

In accordance with embodiments described herein, radiation source localization systems may benefit from a variety of visualization and radiation source localization techniques configured to improve the operational flexibility, reliability, and accuracy of such systems. In particular, embodiments may be configured to provide various display views allowing a user to access and selectively enable such features and capabilities, for example, and may be implemented according to various processes and/or control loops configured to ease pilot burden, protect operation of mobile platforms of such systems, and qualitatively and quantitatively evaluate potential exposure events more quickly and more reliably than conventional systems.

In various embodiments, system 100 may be configured to visualize and characterize a distributed ionizing radiation threat through use of mobile platform 110 and sensors mounted to mobile platform 110. In general, mobile platform 110 may relay directional radiation sensor data back to an operator at base station 130 and/or co-pilot station 230 where it will be rendered on or within a geospatial chart to help visualize and characterize the threat. For example, first responders typically need to assess hazardous situations and determine an extent of a related contamination or threat. Elements of system 100 can autonomously map the extents of the hazard radiation source contamination and overlay resulting sensor data onto a geospatial chart, such that an operator can visualize the full extent of the hazard and proceed safely. Elements of system 100 can also use vision systems to recognize and relay information about warning placards and related information and report specific threats and locations visually. In embodiments where system 100 includes a handheld mobile platform, elements of system 100 can aggregate various data to provide critical and timely warnings and/or safety directives to the user of the handheld platform.

Embodiments may overlay 2D or 3D directional radiation sensor data onto geospatial maps as icons or colored highlights or blobs so that users can visualize the extent of a dangerous contamination. Embodiments may optionally include a second screen/additional base stations so that sensor data can be viewed/operated by user other than the UAV/UGV pilot. Embodiments may use image recognition techniques to read NFPA diamonds and DOT chemical placards using an online or built-in database and relay pertinent hazard information and/or safety directives to users of system 100.

In addition to directional radiation sensor data provided by embodiments of directional radiation detector 160, mobile platform 110 may include embodiments of imaging module 142 configured to provide remote sensor data, such as by gas imaging. For example, imaging module 142 may be implemented as a visible spectrum, infrared, and/or multi-spectrum (e.g., visible and infrared, visible and thermal, or visible, infrared, and ultraviolet) imaging module configured to detect the presence of gaseous analytes and/or estimate the concentrations of particular gaseous analytes, based on their emission and/or absorption spectra, for example, and/or detect the presence of significant radioactive source contamination based on thermal emissions in a survey area. Moreover, mobile platform 110 may be implemented with multiple imaging modules each configured to image a scene according to different spectra (e.g., which may be partially overlapping), and system 100 may be configured to combine or blend such imagery to generate multi-spectral imagery that can be used to help guide mobile platform 110 about a hazardous survey area and/or aim gimbal system 122 and/or radiation sensor cradle 128. As such, system 100 may be configured to perform radiation source localization according to a variety of different detection protocols associated with the individual types of directional radiation sensor data and/or combinations of different types of directional radiation sensor data.

In some embodiments, a display view (e.g., rendered by user interface 132) includes a geospatial chart surrounded by various selector/indicator groups (e.g., a header, payload controller menus, video feed, and platform telemetry indicator) configured to visualize and/or quantify radiation source localizations and operate mobile platform 110 and/or elements of mobile platform 110. For example, a header may include one or more selectors and/or indicators configured to receive user selection of a particular selector to enable, disable, or select active sensor payloads (e.g., imaging module 142, directional radiation detector 160) for display of corresponding georeferenced sensor data within a geospatial chart, for example, or to indicate an operational status of mobile platform 110 and/or various elements of mobile platform 110.

In related embodiments, a geospatial chart includes a mobile platform indicator and dose rate or source localization and/or concentration overlay rendered over a base map or chart. In various embodiments, system 100 may be configured to determine a shape, extent, and/or other characteristics of a radiation source localization overlay within the geospatial chart based, at least in part, on directional radiation sensor data provided by directional radiation detector 160 and orientation and/or position data provided by OPS 167 and/or other orientation and/or position or motion sensors of mobile platform 110 or elements of mobile platform 110 as mobile platform 110 maneuvers within the area shown in the geospatial chart. For example, system 100 may be configured to determine a dose rate or concentration distribution associated with the radioactive source contamination, based on directional radiation sensor data and/or environmental conditions provided by mobile platform 110, and render the dose rate or concentration overlay according to a color mapping to indicate relative concentrations, such as hot colors (e.g., red) to indicate relatively high dose rates or concentrations of radioactive contaminate, and cold colors (e.g., blue) to indicate relatively low dose rates or concentrations of radioactive contaminate. Such color mapping may be based on relative toxicity, for example (e.g., high toxicities are red at relatively low absolute concentrations/ppms), and/or on relative hazard to organics, structures, and/or machinery.

In some embodiments, system 100 may be configured to determine various characteristics of the dose rate or concentration overlay, as displayed within a geospatial chart, based on environmental conditions associated with a survey area. For example, system 100 may be configured to determine a position of a potential source corresponding to the dose rate or concentration overlay based on radiation source localizations measured within the geospatial chart (e.g., by imaging module 142 and/or directional radiation detector 160), a determined wind velocity (e.g., measured according to an automatic drift detection mode), ambient temperature, ambient humidity, and/or other environmental conditions affecting spatial evolution of the detection of the radiative contamination by directional radiation detector 160 and/or mobile platform 110.

In another embodiment, system 100 may be configured to determine multiple types of ionizing radiation or radiative sources are present within a particular survey area, for example, and render each type of ionizing radiation or radiative source according to a different overlay layer presented in a display view, each of which may be selective enabled and/or disabled by a user.

In various embodiments, mobile platform 110 may be configured to adjust its course based on directional radiation sensor data provided by imaging module 142 and/or directional radiation detector 160, for example, and/or based on various environmental conditions measured by sensors mounted to mobile platform 110 or by external systems and communicated to system 100 (e.g., such as regional weather data provided by an online database over a wireless network linked to base station 130 or co-pilot station 230). As such, mobile platform 110 may be configured to autonomously avoid entering hazardous areas (e.g., hazardous dose rates or concentrations of a radioactive source within a particular radioactive source localization) or environments (e.g., significant downdrafts or otherwise undesirable environmental conditions and/or hazardous radioactive areas within such undesirable environmental conditions). For example, sending a UAV/UGV into a hazardous environment can put mobile platform 110 at risk of damage or contamination requiring replacement or decontamination. By adding intelligent hazard avoidance based on radioactivity and environmental sensors carried on-vehicle, hazard exposure can be limited through automatic course adjustment, thereby protecting mobile platform 110 and it associated sensor suite.

Embodiments described herein may provide for autonomous reaction to directional radiation and/or environmental sensor data. For example, controller 112 and/or a controller of base station 130 or co-pilot station 230 may be configured to receive directional radiation and/or environmental sensor data from mobile platform 110 and/or from sensors mounted to mobile platform 110 and to determine course adjustments to avoid detected hazardous radiation localizations and/or environmental conditions. Examples of course adjustments may include halt, climb, and/or reverse course to retreat from a dangerous environment. Such course adjustments may be relayed to a user of base station 130, for example, or may be implemented directly/autonomously by mobile platform 110. Such autonomous response is intended to preserve the integrity of mobile platform 110 and avoid carrying contamination into other non-contaminated areas.

In some embodiments, a display view may include a dose rate and/or radioactive source concentration contour mapping selector configured to cause mobile platform 110 to enter a dose rate or radioactive source contour mapping mode where mobile platform 110 uses directional radiation sensor data provided by imaging module 142 and/or directional radiation detector 160 to determine one or more dose rate or radioactive source concentration boundaries and/or corresponding contour lines within a survey area represented in a geospatial chart. For example, mobile platform 110 may be configured to move mobile platform 110 within the survey area and about the radioactive contamination corresponding to a radioactive contamination overlay to generate sufficient directional radiation sensor data in order to determine a dose rate or radioactive source concentration contour map.

Figure 4:
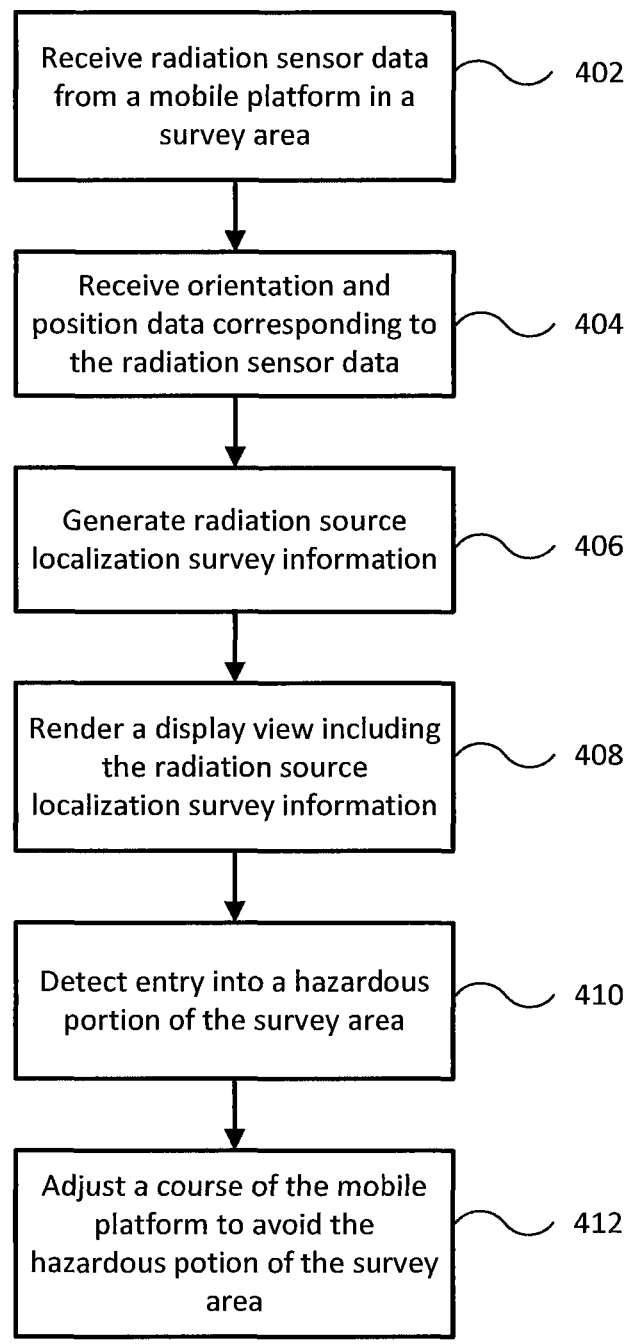
FIGS. 4-5 illustrate flow diagrams of various operations to provide radiation source localization using a radiation source localization system in accordance with embodiments of the disclosure.
Figure 5:
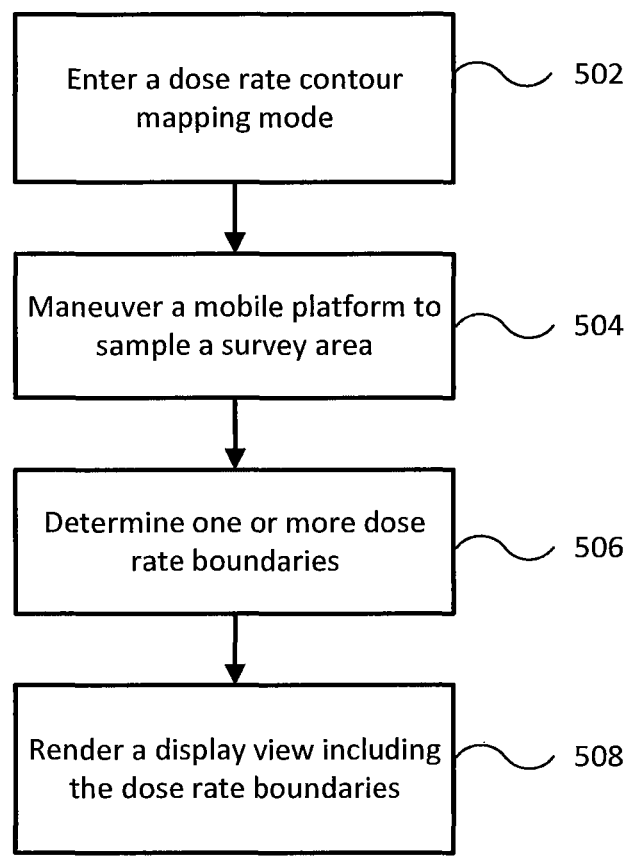

FIGS. 4-5 illustrate flow diagrams 400, 500 of various operations to provide radiation source localization using radiation source localization system 100 in accordance with embodiments of the disclosure. In some embodiments, the operations of FIGS. 4-5 may be implemented as software instructions executed by one or more logic devices or controllers associated with corresponding electronic devices, sensors, and/or structures depicted in FIGS. 1-3. More generally, the operations of FIGS. 4-5 may be implemented with any combination of software instructions, mechanical elements, and/or electronic hardware (e.g., inductors, capacitors, amplifiers, actuators, or other analog and/or digital components).

It should also be appreciated that any step, sub-step, sub-process, or block of processes 400, 500 may be performed in an order or arrangement different from the embodiments illustrated by FIGS. 4-5. For example, in other embodiments, one or more blocks may be omitted from or added to each individual process. Furthermore, block inputs, block outputs, various sensor signals, sensor information, calibration parameters, and/or other operational parameters may be stored to one or more memories prior to moving to a following portion of a corresponding process. Although processes 400, 500 are described with reference to systems described in FIGS. 1-3, processes 400, 500 may be performed by other systems different from those systems and including a different selection of electronic devices, sensors, assemblies, mechanisms, platforms, and/or platform attributes.

Process 400 of FIG. 4 may generally correspond to a method for surveying a survey area using radiation source localization system 100.

At block 402, radiation sensor data from a mobile platform in a survey area is received. For example, controllers 112 and/or 162, communications module 164, user interface 132, communications module 132, and/or other elements of system 100 may be configured to receive directional radiation sensor data from directional radiation detector 160 and/or image data from imaging module 142 as mobile platform 110 maneuvers within a survey area.

In block 404, orientation and position data corresponding to radiation sensor data is received. For example, system 100 may be configured to receive orientation and/or position data corresponding to the directional radiation sensor data received in block 402, such as from orientation sensor 114 and GNSS 118 of platform 110, for example, or from OPS 167.

In block 406, radiation source localization survey information is generated. For example, system 100 may be configured to generate radiation source localization survey information corresponding to the survey area based, at least in part, on a combination of the orientation and/or position data and the directional radiation sensor data received in blocks 402 and 404. In some embodiments, system 100 may be configured to direct mobile platform 110 to adjust a position and/or orientation of directional radiation detector 160 in order to generate the radiation source localization survey information and/or facilitate source localization using one or more of the techniques described herein.

In block 408, a display view including radiation source localization survey information is rendered. For example, system 100 may be configured to render a display view comprising the radiation source localization survey information generated in block 406 in a display of user interface 132. In some embodiments, such the radiation source localization survey information may include geolocated and/or orientation differentiated dose rate measurements, ionizing radiation intensity measurements, estimated source concentrations and/or localization likelihoods, and/or other radiation source localization survey information, as described herein.

In block 410, entry into a hazardous portion of a survey area is detected. For example, system 100 may be configured to detect entry of mobile platform 110 into a hazardous portion of a survey area based, at least in part, on the radiation source localization survey information generated in block 406.

In block 412, a course of a mobile platform is adjusted. For example, system 100 may be configured to adjust a course of mobile platform 110 to avoid the hazardous portion of the survey area detected in block 410.

Process 500 of FIG. 5 may generally correspond to a method for determining a dose rate and/or radioactive source concentration contour map associated with a survey area using radiation source localization system 100.

At block 502, mobile platform 110 enters a dose rate and/or radioactive source concentration contour mapping mode. For example, system 100 may be configured to detect user selection of the dose rate and/or radioactive source concentration contour mapping mode and communicate the selection to mobile platform 110.

In block 504, mobile platform 110 is maneuvered to sample a survey area. For example, system 100 may be configured to control propulsion system 124 of mobile platform 110 to maneuver mobile platform 110 within a survey area to generate radiation source localization survey information, similar to process 400 of FIG. 4.

In block 506, one or more dose rate and/or radioactive source concentration boundaries are determined. For example, system 100 may be configured to determine one or more dose rate and/or radioactive source concentration boundaries based, at least in part, on the radiation source localization survey information generated in block 504.

In block 508, a display view including the dose rate and/or radioactive source concentration boundaries is rendered. For example, system 100 may be configured to render a display view comprising the dose rate and/or radioactive source concentration boundaries determined in block 506 in a display of user interface 132.

By providing such systems and techniques for radiation source localization, embodiments of the present disclosure substantially improve the operational flexibility and reliability of unmanned sensor platforms. Moreover, such systems and techniques may be used to increase the operational safety of users of radiation source localization systems, including of unmanned mobile sensor platforms beyond that achievable by conventional systems. As such, embodiments provide radiation source localization systems with significantly increased survey convenience and performance.

Embodiments described herein have been tested using two NaI based detectors and a planar collimating panel to estimate the direction of a radiation source. Simulations were performed to obtain the counts distributed and energy deposited in the two detectors as a function of the source angle. Comparisons were made between embodiments with and without the planar collimating panel. With a planar collimating panel sandwiched between two detectors, the distribution of detection events and energy spectra changes more quickly (more abruptly and/or with a higher apparent slew rate) as a function of source angle. Furthermore, the gamma attenuation for tungsten is higher than stainless steel, and so tungsten is more effective as a planar collimating panel than stainless steel of the same mass. Embodiments are suitable for deployment in various applications such as backpacks/vests, unmanned ground vehicles, and unmanned aircraft systems, as described herein.

As noted herein, simulations of two types of NaI detectors were compared, 50×50 mm3 right cylinders and 50×50×50 mm3 cubes (e.g., the shapes and volumes of the scintillators). The simulations produced histograms of energy deposited in the detectors by impinging 122, 662, and 1332 keV gammas located one meter away. The gamma sources were placed from 0° to 180° in 10° intervals where 0° refers to the two detectors directly facing the source. Comparisons were made between a 50×50 mm2 tungsten plate (2 mm thick) or stainless-steel plate (5 mm thick) sandwiched between the two detectors and no planar collimating panel. The corresponding tungsten and stainless-steel plates each weigh roughly about 100 g, which is equivalent to approximately one quarter the weight of an NaI detector.

Figures 6, 7:
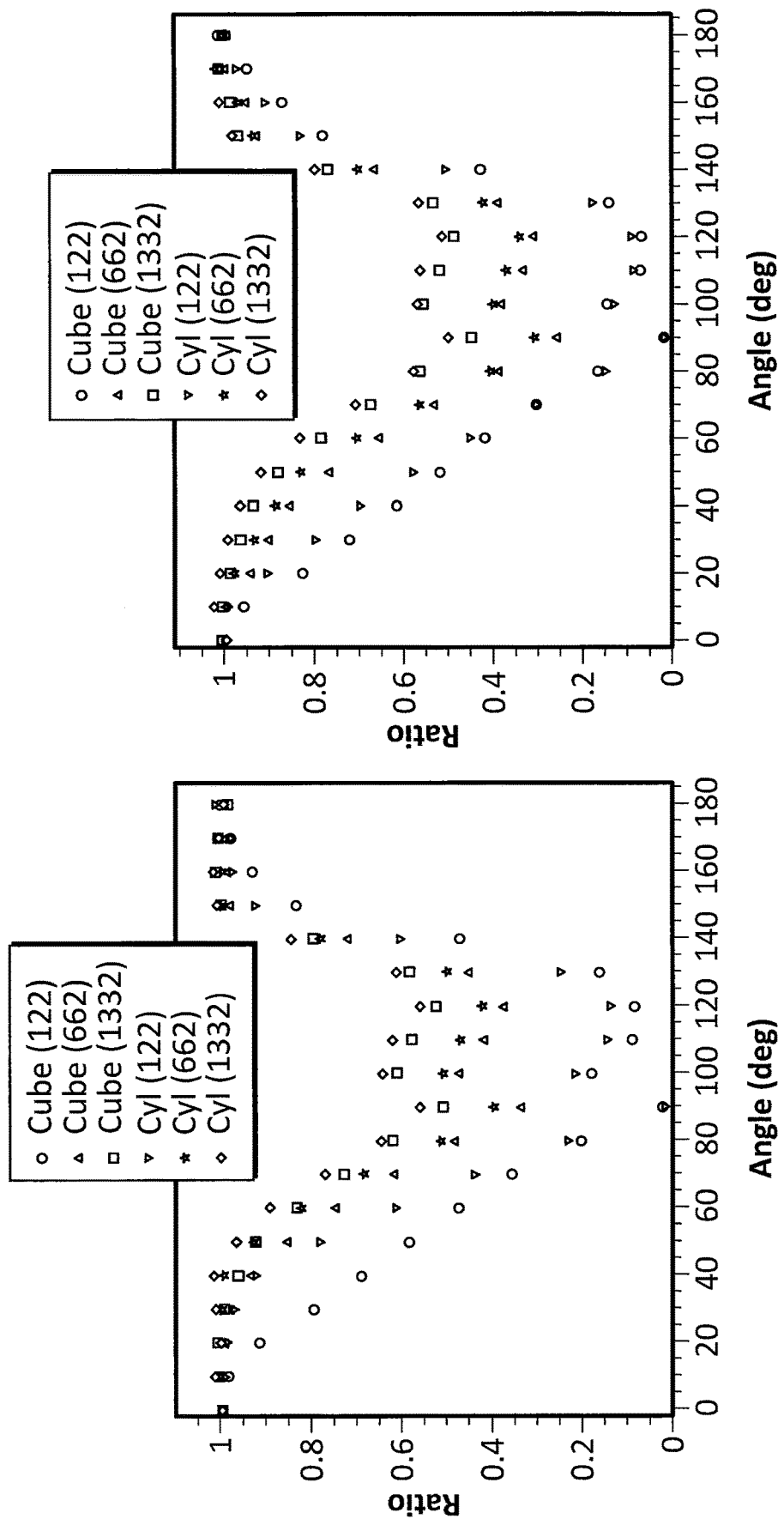
FIGS. 6-8 illustrate simulation results corresponding to operation of a radiation source localization system in accordance with embodiments of the disclosure.

The simulated ratio of counts in the two detectors (far-side/near-side) as a function of source angle are shown in FIG. 6. At 0°, the two detectors are exposed to the source evenly without any obstacle. As expected, the ratio of counts is 1. As the source moves towards 90°, the shielding of the far-side detector by the near-side detector increases and the ratio of counts decreases. The ratio of counts reaches the minimum for the source located at 90° where the occlusion is maximized. Once the source is located beyond 90°, the scattering of gammas in the phantom occurs so that the ratio of counts does not rise quickly until the source angle is greater than 130°.

In FIG. 6, the solid symbols are for detector cubes and the open symbols are for detector cylinders. For all three gamma energies, the effect of occlusion by cubical detectors is larger than that by cylindrical detectors. However, the ratio of counts does not deviate significantly from 1 until the source angle is larger than 40°. As a result, the directionality estimation is relatively poor for the source located between 0 and 40°. The only exception is for the cubical detectors with the 122 keV gamma where the estimation of source direction is achievable at angles as small as 20°. Since the gamma attenuation decreases with increasing energies, estimating the source direction by occlusion works better for lower energy gammas. This can be seen by the faster decrease of the ratio of counts for lower energy gammas.

To increase the effect of occlusion, the simulation was modified by introducing a planar collimating panel of 50×50×2 mm3 tungsten inserted between the two detectors. FIG. 7 illustrates the results for such simulations. As can be seen, the source direction can be deduced for angles starting at 20°. For the cubical detector, the source direction can be deduced even at 10° for the 122 keV gamma.

Figure 8:
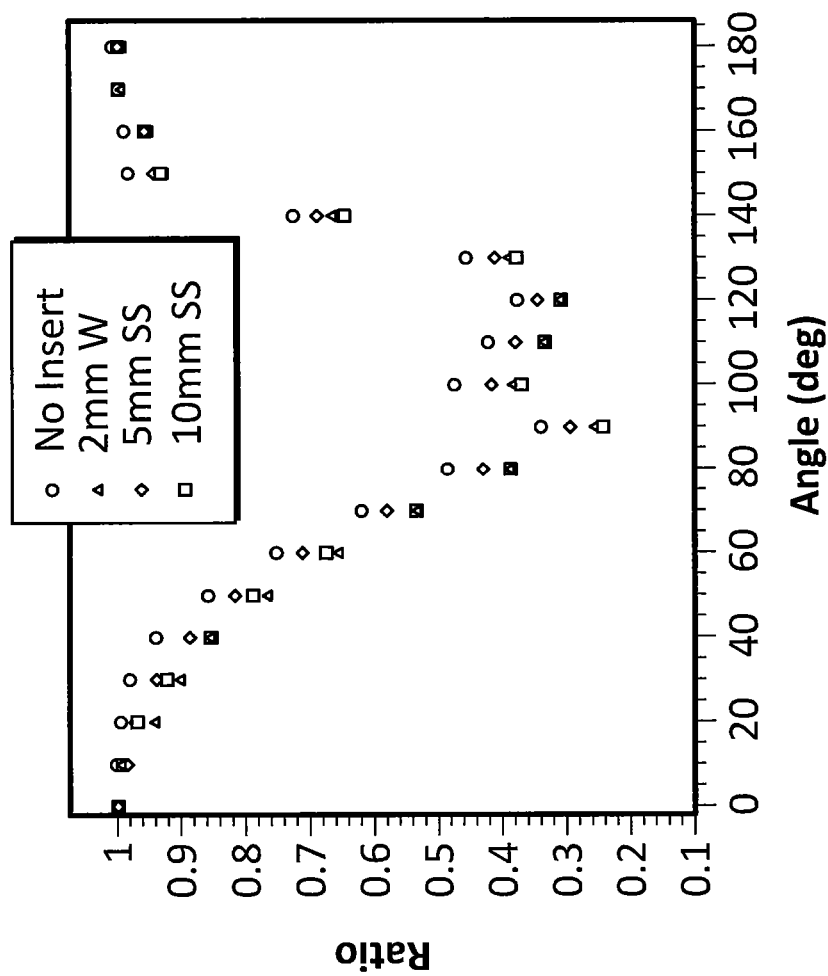

FIG. 8 shows the results for simulations replacing the 2 mm thick tungsten with a 5 or 10 mm thick stainless-steel plate for the 662 keV gammas. As noted herein, the weight for the 2 and 5 mm plates are very similar. Because the gamma attenuation for stainless steel is less than that for tungsten, the effect of occlusion by stainless steel is smaller. In spite of this, the source direction can be estimated by the ratio of counts for angles larger than 20°. In order for the stainless steel to work as effectively as tungsten, it is necessary to double the thickness to 10 mm, as shown by the open circles. Consequently, such detector system would be approximately 100 g heavier as compared to that with the 2 mm tungsten insert.

As described herein, in some embodiments, directional radiation sensor data may be represented by a ratio of counts accumulated in radiation detectors separated from each other by a planar collimating panel, for example, which may be used to generate a source localization display view indicating a relative direction towards a source (e.g., source 320). For instance, with respect to directional radiation detector 160 (e.g., with 2 radiation detectors separated from each other by planar collimating panel 342, as shown in FIG. 3), such ratio of counts may be the number of detected ionization events occurring within (right, or top, from the viewpoint of sensor axis 344) scintillator 302a within a selected accumulation time period (e.g., 1, 5, 10, 30, or 60 seconds, for example, or longer as needed for directional sensitivity) divided by the number of detected ionization events occurring within (left, or bottom) scintillator 302b within the same accumulation time period. In such embodiments, a relative source direction indicator may point or indicate a direction along sensor axis 344 for an accumulation ratio equal to 1, to the right of or above sensor axis 344 for an accumulation ratio less than 1, and to the left of or below sensor axis 344 for an accumulation ratio greater than 1. Accordingly, a handheld embodiment of directional radiation detector 160 (e.g., with display 333) may be configured to indicate the relative direction towards source 320 as a user sweeps directional radiation detector 160 through a range of orientations. Moreover, the user may rotate directional radiation detector 160 90 degrees about sensor axis 344 to switch from left/right indications to top/bottom indications (e.g., in embodiments with just two radiation detectors 340a,b).

In related embodiments, directional radiation sensor data may be represented by a time series of accumulation ratios and corresponding orientation and/or position (OPS) data, which together may be used to generate a display view including a geographical map of a survey area indicating likely locations of source 320 and/or directional radiation detector 160 within a survey area. For example, such directional radiation sensor data may be used to generate a heatmap indicating the likely locations of source 320 within the survey area. The heatmap may overlay a geographic map of the survey area and show increasing intensity or heat (e.g., color and/or opacity occluding the underlying geographic map) where cone-shaped swaths of the survey area corresponding to sampled accumulation ratios (and their corresponding OPS data) overlap each other as directional radiation detector 160 is maneuvered within the survey area. Such geographic map and/or heatmap overlay, and the generated display view, may be two dimensional or three dimensional, depending on the type and range of directional radiation sensor data provided by directional radiation detector 160.

In some embodiments, the directional radiation sensor data may include time stamps for each or both of the accumulation ratio and corresponding OPS data. In specific embodiments, the OPS data may be acquired or sampled or averaged over the same accumulation time period for each accumulation ratio, for example, or may be acquired or sample within the corresponding accumulation time period (e.g., at the beginning, middle or end of the accumulation time period). In various embodiments, the directional radiation sensor data may include additional sensor and/or status data, such as environmental temperature or image data (e.g., provided by imaging system 140), for example, or status data corresponding to a maneuvering status of platform 110 or relative position of base station 130.

In additional embodiments, each accumulation ratio may be differentiated by spectral features unique to selected isotopes, as opposed to just being a gross event count attributed to one or another radiation detector 340a,b. For example, memory 163 of directional radiation detector 160 may include a selection or library of isotope identification spectrums, and detector controller 162 may be configured to accumulate both the number of detected ionization events and their energies (for each radiation detector 340a,b) over a selected accumulation time period, differentiate detected ionization events by isotope (e.g., source type) by comparing the isotope identification spectrums provided by memory 163 to the accumulated detected ionization events, and determine isotope-specific accumulation ratios for each different source within a survey area about directional radiation detector 160.

Each isotope identification spectrum may include various characteristics of the spectrum attributable to a specific isotope, such as the energies of all peaks in the spectrum, the relative intensities of each peak in the spectrum (e.g., relative to each other), the relative widths of each peak in the spectrum (e.g., relative to each other and/or relative to that peak's intensity), and/or other isotope-specific spectrum characteristics or identifiable features detectable by directional radiation detector 160. In addition, the various display views described herein may be configured to indicate the relative directions towards spatially and isotopically differentiated sources as a user sweeps directional radiation detector 160 through a range of orientations, for example, or to generate a heatmap or other two or three dimensional geospatial plot of a survey area that is configured to indicate the locations of the spatially and isotopically differentiated sources within the survey area.

While each of the above embodiments are described with respect to an embodiment of directional radiation detector 160 including a plurality of individual radiation detectors 340, such that the accumulation ratios are generated with respect to simultaneous counts differentiated among the individual radiation detectors 340, similar techniques may be used with embodiments of directional radiation detector 160 including just a single radiation detector 340 and OPS 167, but where the accumulation ratios are generated with respect to temporally differentiated counts from the same radiation detector 340. As such, the techniques described herein may be performed by embodiments of directional radiation detector 160 including OPS 167 and only a single radiation detector 340a and lacking a planar collimating panel (e.g., as described more fully with respect to FIG. 10).

For example, particularly with respect to embodiments where each accumulation ratio may be differentiated by spectral features unique to selected isotopes, a first set of detected ionization events (corresponding to a single radiation detector 340a) may be accumulated over a selected accumulation time period and at a first time (e.g., and corresponding to a first set of OPS data), and a second set of detected ionization events (corresponding to the same single radiation detector 340) may be accumulated over the same selected accumulation time period but at a second time (e.g., corresponding to a second set of OPS data). In some embodiments, detector controller 162 may be configured to determine a direction towards one or more isotopically and/or spatially differentiated sources based, at least in part, on isotope identification spectrums provided by memory 163, corresponding temporal accumulation ratios, and/or OPS data provided by OPS 167 (e.g., collectively directional radiation sensor data), as described herein.

For instance, an isotope-specific temporal accumulation ratio may be the number of detected ionization events associated with a first isotope occurring within scintillator 302a and within a selected accumulation time period at the first time, divided by the number of detected ionization events associated with the first isotope occurring within scintillator 302a within the same accumulation time period but at the second time. In such embodiments, a relative source direction indicator may point or indicate an unknown relative direction for an accumulation ratio equal to 1, substantially parallel to a position change vector corresponding to a change in position of directional radiation detector 160 between the first and second times for an isotope-specific temporal accumulation ratio less than 1 (e.g., as measured by OPS 167), and substantially antiparallel to the position change vector for an isotope-specific temporal accumulation ratio greater than 1.

Accordingly, a handheld embodiment of directional radiation detector 160 (e.g., with display 333) may be configured to indicate the relative direction towards source 320 as directional radiation detector 160 is maneuvered past source 320. Additional refinements may be used to increase the accuracy of such relative source direction indicator, such as correcting the relative direction based on an inverse square distance intensity field map, for example, or other algorithmic and/or physical radiation measurement characteristics, as described herein. Moreover, in related embodiments, such directional radiation sensor data may be represented by a time series of accumulation ratios and corresponding orientation and/or position (OPS) data, which together may be used to generate a display view including a geographical map of a survey area indicating likely locations of source 320 and/or directional radiation detector 160 within a survey area, as described herein. In some embodiments, system 100 may be configured to direct mobile platform 110 (e.g., an unmanned vehicle, for example, or a human operator) to move within the survey area in a way to facilitate source localization via a time series of temporal accumulation ratios, such as a maneuver that includes a first position change vector and a second position change vector that is orthogonal to the first position change vector (e.g., in two or three dimensions, depending on the relative position of the source, the survey area terrain, and/or a corresponding desired source localization mode).

In various embodiments, each accumulation ratio (e.g., pairwise detector accumulation ratio, temporal accumulation ratio, isotope-specific accumulation ratio, or any combination of these) may be based on the total event counts within the accumulation time period(s) (e.g., the total accumulated energy), for example, or may be based on various subsets of the total even counts. In one embodiment, the accumulation ratio may be based on the event counts attributed to one or more particular photopeaks within the accumulated spectrums, such as photopeaks and/or photopeak characteristics associated with a particular radiological isotope and/or identified within the selection or library of isotope identification spectrums within memory 163. In another embodiment, the accumulation ratio may be based on the mean energy associated with the total event counts accumulated during the accumulation time period(s), for example, or those counts attributed to one or more particular photopeaks within the accumulated spectrums, as described herein. In a further embodiment, the accumulation ratio may be based on the total event counts within specific energy windows that may include multiple photopeaks, such as when the detected radiological source produces a relative complex and/or dense spectrum (e.g., as with TH-232, Ra-226, uranium, plutonium, etc., and/or combinations of these). Examples of such energy window extents (lower and upper bounds) include: 25<E<300 keV; 300<E<740 keV; 740 keV<E<[detector upper bound, typically >1332 keV]. In such embodiments, the accumulation ratio for each energy window may be presented to an operator individually, for example, or may be combined together to increase the overall accuracy of the resulting source localization.

In additional embodiments, raw event count data may be preprocessed before determining any of the accumulation ratios described herein, so as to provide more sensitive and/or accurate source localization. For example, in some embodiments, detector controller 162 may be configured to acquire and/or determine a natural background count contribution associated with a particular accumulation time period (e.g., before entering a particular survey area), for example, and remove that natural background count contribution from the raw event count data before or as part of determining a particular accumulation ratio. In other embodiments, detector controller 162 may be configured to identify a Compton scattering component associated with a particular isotope spectrum, based on the raw event count data and/or the selection or library of isotope identification spectrums within memory 163, and remove the Compton scattering component from the raw event count data before or as part of determining a particular accumulation ratio.

In some embodiments, accumulation ratios may be used to help identify shielding or absorptive objects within a survey area, which in turn may be used to help refine and/or speed source localization techniques, as described herein. For example, the total event count rate and the ratio of photopeak count rate to total even count rate changes when a source is shielded from the directional radiation detector by an ionizing radiation absorptive object. System 100 may be configured to detect such absorption-based changes in the raw and processed event count data associated with a time series of accumulation time periods, for example, identify and localize candidate absorptive objects within the survey area (e.g., using image data provided by imaging system 140), and then combine OPS data associated with the absorption-based changes and the relative positions of the candidate absorptive objects to both identify the actual absorptive objects and refine the relative position of a source within the survey area by correlating the absorption-based changes with necessary relative positions of the actual absorptive objects and the source to produce the identified absorption-based changes.

The use of portable and/or handheld radiation detectors for automatic localization of sources is highly desirable for defense, security, and safeguard operations. The integration of at least positional data from an inertial measurement unit (IMU) or OPS with radiation data allows for mapping of a radiation field and source localization. Advanced spectral techniques such as 2D peak searching and others described herein allows detection devices to simultaneously track the radiation field of multiple different isotopes by identifying spectral features unique to each isotope and combining radiation data corresponding to such spectral features with OPS data. Inverse square laws, energy efficiencies, and counting statistics associated with radiation detection allow for embodiments to make Bayesian inferences as to where sources are located based on relatively sparse data sets. This allows for relatively efficient and automatic localization, as opposed to current non-directional "hot or cold" total raw count surveys which require careful operator observation and experienced intuition, both of which may be unavailable in a crisis.

For example, localization of radioactive sources using conventional non-directional radiation detectors currently relies on a "hot or cold" search. As an operator gets closer to a source with an instrument, the instrument registers a higher dose rate. While this method is effective in a variety of situations, it has several shortcomings. Isotope differentiation when multiple sources are present can require five minutes or longer accumulation before even an experienced operator can identify even one isotope; in a crisis it is not advisable to rely on intuition given possible threat scenarios. Using spectral data in conjunction with OPS data allows for a more automated approach that removes much of the guesswork and waiting for identification confirmations. If objects are between the detector and a source, conventional systems have no automated way of detecting and reporting this scenario. By examining spectral features in conjunction with OPS data, it becomes possible to determine if there are objects that are only partially shielded at specific relative positions. This is useful for facilities where leaks may be an issue or in finding sources that were not hidden well in a con-ops scenario. For mapping radiation fields within a facility (especially in hazardous zones), the spectral data may change over time even though the positional data has not. Embodiments provide a time dependent map of the radiation fields within a facility that may change due to air circulation or suspicious relocation of sources. An IMU or OPS reduces risk of movement and position uncertainties due to operator movement and provides relatively accurate tracking of moving sources.

Embodiments may include one or more scintillators or scintillator types (e.g., NaI, CsI, LaBr, CeBr, etc.) coupled to photosensors (silicon photomultiplier, photomultiplier tube, any other type of photomultiplier), semiconductors (CZT, TlBr, Ge, etc.), inertial measurement units or OPSs (accelerometers, gyroscopes, magnetometers, GPS), or a combination of the above. Embodiments measure incoming gamma radiation and record the events and their energies. From this energy data or spectrum, the specific radioisotopes that emit those detected gamma rays can be identified (e.g., by spectrum characteristic matching, pattern matching, and/or other computer algorithms). By comparing a series of spectra observed over time and its corresponding IMU/OPS data, the relative and/or absolute direction to and location of multiple radioactive sources can be determined. Furthermore, a radiation heatmap can be developed with contours corresponding to dose rates, intensities, and spectral features present at a given location and/or according to a particular orientation. The use of physics models with inverse square distance relationships and Monte Carlo based statistical analysis can be used to infer additional characteristics about the sources present within the survey area.

For example, when a gamma radiation detector is moved to approach and pass a source (e.g., along a linear path), the greatest signal strength/largest count flux will be present when the distance to the radiation detector is minimized (when a perpendicular can be drawn from the path of the detector's movement to the source). The histogram of spectral data connected to the movement of the detector can be used to pinpoint the source direction to a very small cone. A simple example would be to correlate the most intense radiation measurements with the location of the radiation detector given by GPS or orientation from a compass. In all practical cases this leads to exactly localizing the source. This new technique can isolate multiple sets of peaks and spectral features unique to given isotopes simultaneously so that the locations of multiple isotopes can be determined simultaneously. In various embodiments, data may be viewable as a spectrogram as used in sound analysis, but for radiation measurements.

With respect to Monte Carlo based statistical analysis, improvements upon the accumulation ratio based source localization may be achieved by using the statistical analysis to both identify the most likely isotope-specific spectrums within the raw count data and to identify the most likely change in relative position contributing to the determined accumulation ratio. For example, for each isotope in a library of isotope identification spectrums, each isotope can be represented as a rank 1 matrix of size m (e.g., 1024), Ai where i is a natural number up to the total number of isotopes n in the library. This vector can then be used as a probability density function for sampling in order to represent experimentally collected spectra. The experimentally collected spectra may be conformed to a rank 1 matrix of the same size m, AExp. As such, it can include a linear combination of all Ai in the library so that AExp=Sum(ai*Ai) for i=1, . . . , n. For isotopes that are not present, the scalar factor ai is equal to 0. In such embodiments, it is possible to quickly and accurately identify two or more dominant isotopes in a raw spectra through template matching. It is then possible to sample from those given isotopic distributions such that, for example, AExp=a1A1+a2A2+a3A3+b*E where E is the residual due to statistical variations in the background, unrepresented isotopes (missing from the library), or electronic noise.

Each AExp spectrum can be extended to a rank p matrix by generating a time series of sample slices of a given accumulation time period, such that each AExp,p shows how the raw spectrum evolves over time. In some embodiments, each AExp,p series of spectra may be implemented as a waterfall map (x axis is energy, y axis is time, cell value is the count in that energy bin over the specified accumulation time), and machine learning techniques may be used to identify areas of change or "mountains" that form in the raw spectra, such as in the case of a detector approaching then receding from a source, as well as to identify the source or sources present within AExp, at what times, and at what relative locations, as explained herein.

In addition, Markov Chain Monte Carlo techniques may be used to smooth out any noise in the AExp spectra. Variations are expected when drawing from a probability distribution especially with low amounts of samples (e.g., longer accumulation time periods, sparse accumulation times). This would normally be well suited for a simple Monte Carlo analysis of the sample. However, recent samples are inferentially dependent upon older samples due to the continuum of kinetic movement of the drone or operator, and Markov Chains may be used to predict the evolution of the older spectra into the newer spectra based on the pragmatic physical limits of the kinetic motion. For example, because the 1/r2 law applies to radiation source strength, recent samples are dependent upon prior samples plus the increase or decrease in flux expected from a concomitant change in position. The breadth of Markov Chains at each transition from prior sample to recent sample (e.g., covering an expected range of changes in relative position of the source) provides for inference of the relative position of the source because only one Markov Chain will represent the reality in the recent sample.

In various embodiments, a random walk algorithm may be used as a Markov Chain Monte Carlo generator with a cost function applied to guide the solutions. A Gibbs Sampling technique may be used in most circumstances because solutions should be close to one another ("local" in mathematical terms) along the physical kinetic continuum. However, under some conditions, there is a risk of falling into local minimums or valleys (with respect to the cost function) and becoming algorithmically stuck (e.g., when the source spectra is relatively weak). Metropolis-Hastings may be used as a more globally reliable technique for implementing the Markov Chain Monte Carlo techniques but may be more expensive computationally and so more appropriate for off-device processing or post-processing. By making many guesses and then comparing it to the subsequent recent spectra, the direction to and relative position of the source may be estimated. Such techniques may be used with multiple spectra simultaneously, for example, and may be used to supplement and/or as an alternative to accumulation ratio techniques (e.g., where the accumulation ratio technique may be used to provide a coarse source localization, which may be used (e.g., along with motion characteristics and/or measurements of platform 110) to limit the breadth, number, and/or other characteristics of the representative Markov Chains, as described herein.

In various embodiments, a directional radiation detector may be implemented as a smart device equipped with on board electronics including a preamp, bias supply, temperature sensor, digital signal processing (e.g., implemented within an FPGA), and an inertial measurement unit (IMU) or OPS, as described herein. The directional radiation detector may be pre-calibrated in the factory and its gain stabilized by a built-in algorithm using temperature data from the temperature sensor (e.g., other modules 170). A user may supply main power and receive and view radiation measurements as user feedback via a display device (e.g., handheld, wearable, backpack) or via a wired/wireless data transfer to a base station (e.g., unmanned vehicle). In the latter case, the user may use an app on a smartphone or a tablet to obtain characteristics of the measurements, build energy histograms, perform radionuclide identification, and/or otherwise view and/or further process such data. The data may also be integrated with data from other sensors for increased situational awareness.

Embodiments may include a directional radiation detector configured to detect incident gamma radiation, to determine the direction of incident gamma radiation, and to use OPS data (e.g., including a time series of OPS data) to localize radiation sources. Such embodiments may include gamma detectors, neutron detector panels, and neutron moderators. As such, embodiments may detect and localize gamma radiation and/or neutron radiation, and may be scalable (e.g., to a system with multiple individual detectors or multiple directional radiation detectors, as described herein. Each directional radiation detector may be implemented as personal radiation detectors (PRDs), spectroscopic PRDs (SPRDs), radioisotope identification devices (RIIDs), and man-portable radiological detection systems (MRDSs). When present, gamma detectors may be configured measure gamma count rate and energy, and the systems may be configured to perform radionuclide identification from the resulting gamma energy spectrum. Embodiments with neutron detector panels may be configured to measure neutron count rate. Embodiments may be configured to determine the location of multiple different isotopes simultaneously and/or to generate radiation maps identifying the locations of such isotopes, as described herein.

Figure 9:
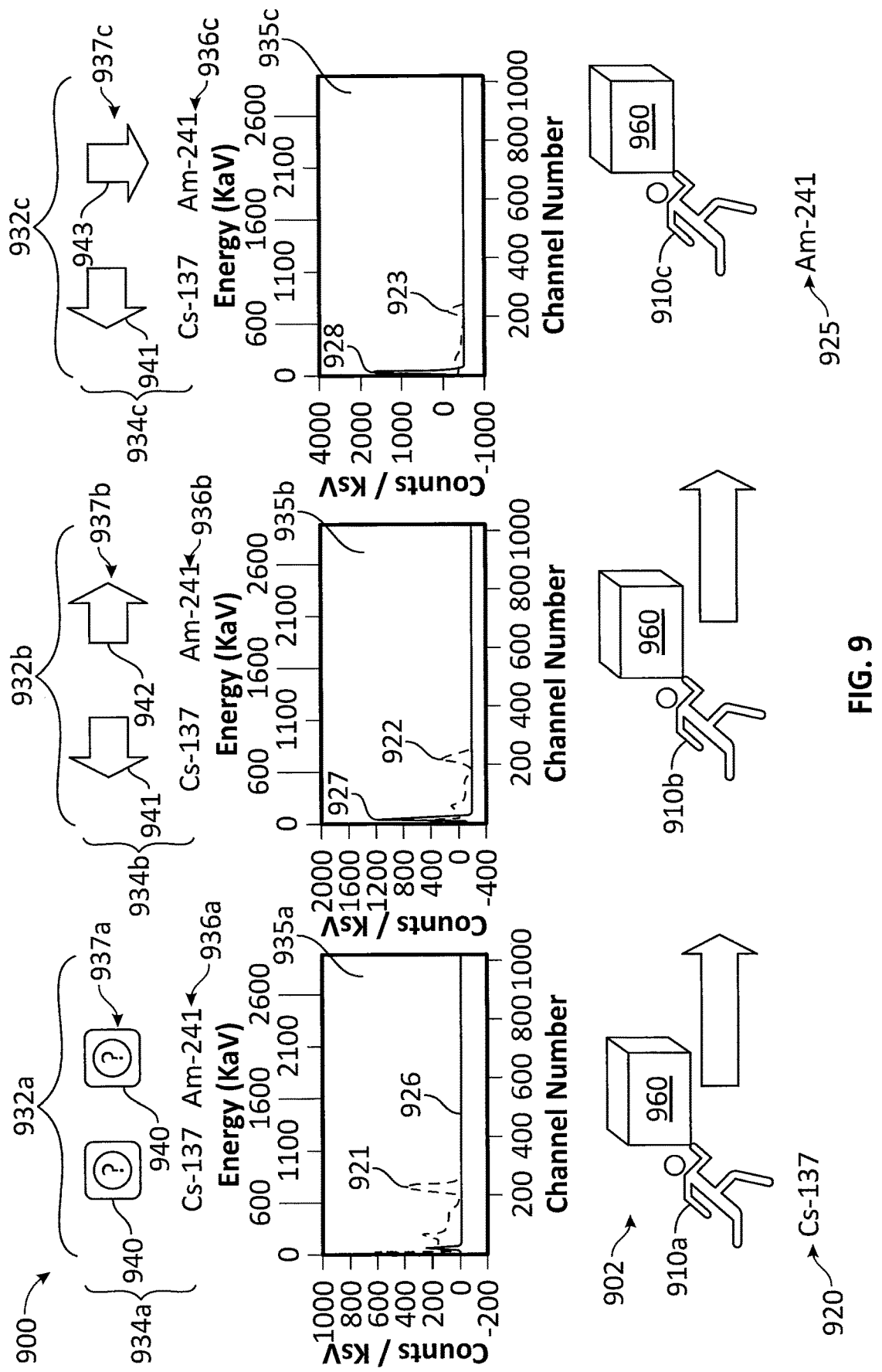
FIG. 9 illustrates a diagram of a radiation source localization system in accordance with an embodiment of the disclosure.

FIG. 9 illustrates a diagram of a radiation source localization system 900 in accordance with an embodiment of the disclosure. In particular, FIG. 9 shows the time evolution of radiation source localization system 900 as an operator (mobile platform 910) transports directional radiation detector 160 within survey area 902 between two sources: Cs-137 source 920 and Am-241 source 925, as represented at three distinct times within a time series a, b, c. As shown in FIG. 9, detector controller 162 of directional radiation detection system 960 (e.g., an embodiment of directional radiation detection system 160 of FIG. 3 and/or 1060 of FIG. 10) may be configured to render display view 932a at time a while operator 910a is adjacent source 920 and relatively far away from source 925. In various embodiments, display view 932a may include a source localization display 934a including source type identifiers 936a configured to indicate the various identified radiological isotopes in detected ionization events accumulated at time a, relative direction indicators 937a configured to indicate a relative direction from directional radiation detection system 960 to the corresponding identified source types (e.g., referenced/relative to sensor axis 344), and/or other source localization display elements, as described herein. In some embodiments, display view 932a may include a spectrum graph 935a of the detected ionization events accumulated at time a, which itself may include source type differentiated spectrum plots (e.g., Cs-137 spectrum plot 921 and Am-241 spectrum plot 926) corresponding to the source types identified by source type identifiers 936a.

Figure 10:
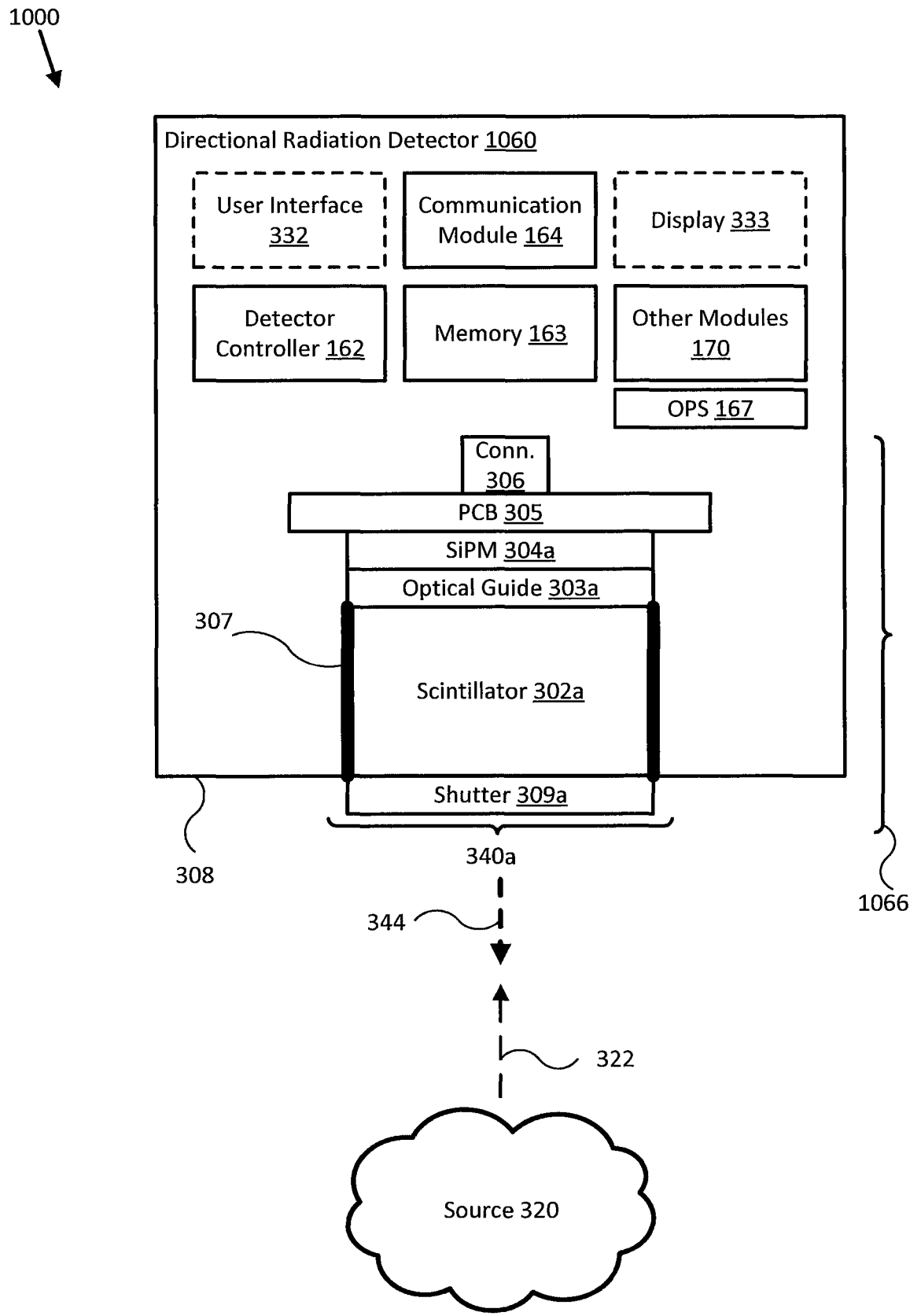
FIG. 10 illustrates a diagram of a directional radiation detector for a radiation source localization system in accordance with an embodiment of the disclosure.

In embodiments where directional radiation detector 960 is implemented with a single radiation detector 340a, similar to directional radiation detector 1060 in FIG. 10, at time a, relative direction indicators 937a may be rendered as unknown relative direction indicators 940 because there is no temporal accumulation ratio available from which to determine a relative direction to source 920 or source 925. In embodiments where directional radiation detector 960 is implemented with a plurality of radiation detectors 340a,b, similar to directional radiation detector 160 in FIG. 3, at time a, relative direction indicators 937a may be rendered as adjacent source indicator or arrow 943 for Cs-137 and pointing towards source 920, and as distant source indicator or arrow 942 for Am-241 and pointing towards source 925 (e.g., roughly parallel to a position change vector between the position of directional radiation detector 960 at time a and at time b or c).

Similarly, detector controller 162 of directional radiation detection system 960 may be configured to render display view 932b at time b while operator 910b is between source 920 and source 925, and to render display view 932c at time c while operator 910c is adjacent source 925 and relatively far away from source 920. In various embodiments, display view 932b may include a source localization display 934b including source type identifiers 936b configured to indicate the various identified radiological isotopes in detected ionization events accumulated at time b, relative direction indicators 937b configured to indicate a relative direction of the corresponding identified source types, and/or other source localization display elements, as described herein. In some embodiments, display view 932b may include a spectrum graph 935b of the detected ionization events accumulated at time b, which itself may include source type differentiated spectrum plots (e.g., Cs-137 spectrum plot 922 and Am-241 spectrum plot 927) corresponding to the source types identified by source type identifiers 936b. Similarly, display view 932c may include a source localization display 934c including source type identifiers 936c configured to indicate the various identified radiological isotopes in detected ionization events accumulated at time c, relative direction indicators 937c configured to indicate a relative direction of the corresponding identified source types, and/or other source localization display elements, as described herein. In some embodiments, display view 932c may include a spectrum graph 935c of the detected ionization events accumulated at time c, which itself may include source type differentiated spectrum plots (e.g., Cs-137 spectrum plot 923 and Am-241 spectrum plot 928) corresponding to the source types identified by source type identifiers 936c.

In various embodiments, at time b, relative direction indicators 937b may be rendered as distant source indicator or arrow 941 for Cs-137 and pointing towards source 920 (e.g., roughly anti-parallel to a position change vector between the position of directional radiation detector 960 at time a and at time b), and as distant source indicator or arrow 942 for Am-241 and pointing towards source 925 (e.g., roughly parallel to the position change vector between the position of directional radiation detector 960 at time a and at time b). Similarly, at time c, relative direction indicators 937c may be rendered as distant source indicator or arrow 941 for Cs-137 and pointing towards source 920 (e.g., roughly anti-parallel to a position change vector between the position of directional radiation detector 960 at time b and at time c), and as adjacent source indicator or arrow 943 for Am-241 and pointing towards source 925.

As shown in FIG. 9, Cs-137 spectrum plots 921, 922, 923 of spectrum graphs 935a,b,c show steadily decreasing peak intensities as directional radiation detector 960 moves further away from source 920, and Am-241 spectrum plots 926, 927, 928 of spectrum graphs 935a,b,c show a steadily increasing peak intensity as directional radiation detector 960 moves closer to source 925. As described herein, the isotope-specific temporal accumulation ratios associated with times a-b, b-c, and a-c, along with OPS data acquired at times a, b, c (e.g., the directional radiation sensor data provided by directional radiation detector 960) may be used to determine the relative locations of sources 920 and/or 925 as directional radiation detector 960 is maneuvered within survey area 902. Moreover, in embodiments where directional radiation detector 960 includes a plurality of radiation detectors 340a,b, the accumulation ratios associated with times a, b, c, along with OPS data acquired at times a, b, c (e.g., the directional radiation sensor data provided by directional radiation detector 960) may also be used to determine the relative locations of sources 920 and/or 925 as directional radiation detector 960 is positioned and/or maneuvered within survey area 902, as described herein.

FIG. 10 illustrates a diagram of a directional radiation detector 1060 for a radiation source localization system 1000 in accordance with an embodiment of the disclosure. In various embodiments, directional radiation detector 1060 includes many elements that are similar to elements of directional radiation detector 160 of FIG. 3, which are configured to operate similarly and provide similar functionality, as described herein. In addition, directional radiation sensor assembly 1066 of directional radiation detector 1060 is implemented with a single radiation detector 340a and directional radiation detector 1060 includes OPS 167 but omits planar collimating panel 324. As such, embodiments of directional radiation detector 1060 generally rely on isotope-specific temporal accumulation ratios and OPS data to provide source localization, as described herein.

Figure 12:
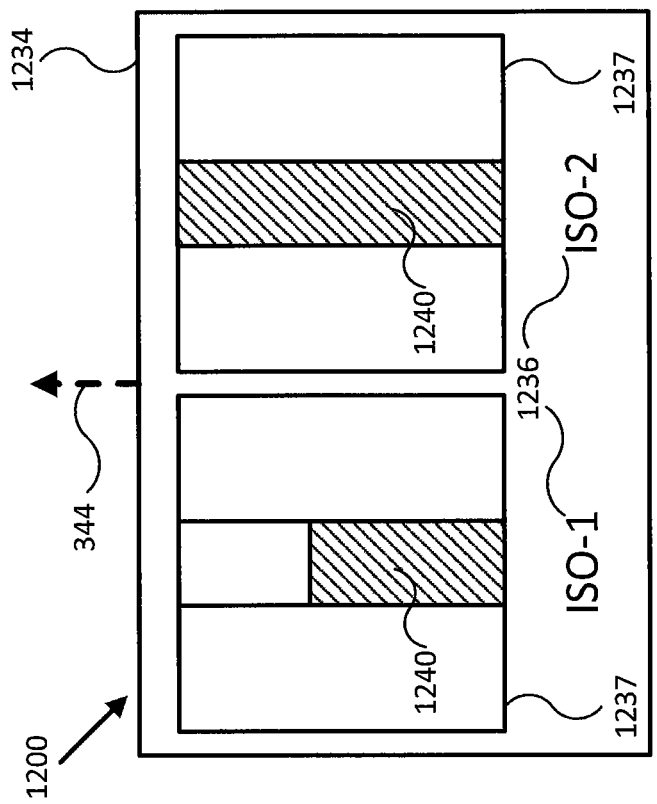
FIGS. 11A-B and 12 illustrate display views rendered by a user interface for a radiation source localization system in accordance with embodiments of the disclosure.
Figure 11A:
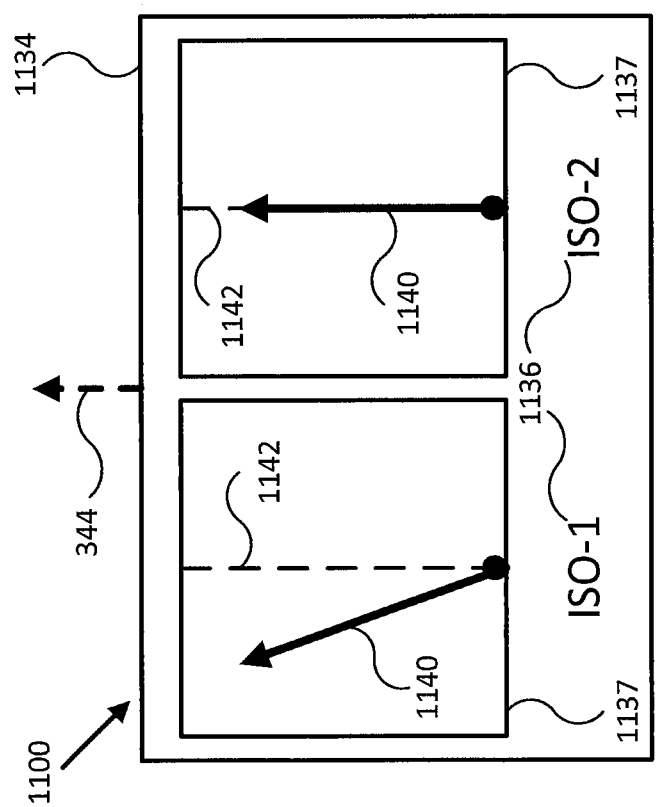
Figure 11B:
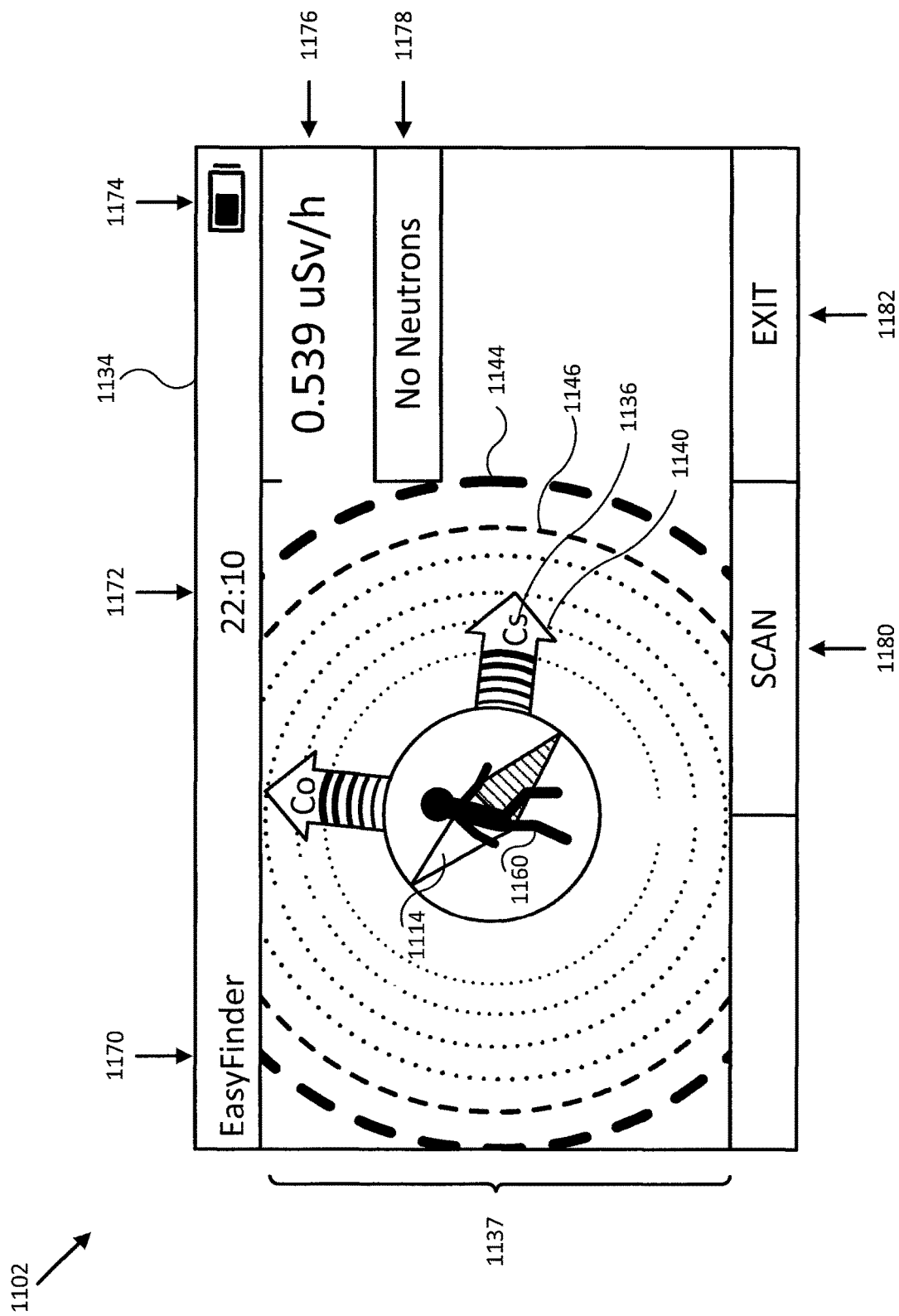

FIGS. 11A-B and 12 illustrate display views rendered by user interface 332 (e.g., on display 333) for radiation source localization systems 100, 300, and/or 1000 in accordance with embodiments of the disclosure. In FIG. 11A, display view 1100 includes source localization display 1134 implemented as a needle gauge display rendered on display 333 as user feedback of operation of directional radiation detectors 160 and/or 1060, as described herein. For example, source localization display 1134 may include one or more relative direction indicators 1137 each including a directional arrow or needle 1140 and a centerline 1142 aligned with sensor axis 344, for instance, and a corresponding source identifier 1136. In some embodiments, needles 1140 may be configured to indicate the present accumulation ratio (e.g., isotope-specific accumulation ratio) associated with a pair of radiation detectors 340a,b and the number of detection event counts registered by each radiation detector 340a,b within a selected accumulation time period, as described herein, where an accumulation ratio of 1 aligns needle 1150 with centerline 1142. In other embodiments, needles 1140 may be configured to indicate the present temporal accumulation ratio (e.g., isotope-specific temporal accumulation ratio) associated with a radiation detector 340a, two different accumulation times, and the number of detection event counts registered by radiation detector 340a at each accumulation time, as described herein.

In FIG. 11B, display view 1102 includes source localization display 1134 implemented as a source status display rendered on display 333 as user feedback of operation of directional radiation detectors 160 and/or 1060, as described herein. For example, source localization display 1134 may include a relative direction indicator 1137 including one or more directional arrows 1140 (e.g., "up" within relative direction indicator 1137 may be aligned with sensor axis 344), for instance, each with a corresponding source identifier 1136.

In some embodiments, the orientations of directional arrows 1140 within relative direction indicator 1137 may be configured to indicate the present relative direction towards a detected source (e.g., based on the present accumulation ratio (e.g., isotope-specific accumulation ratio), temporal accumulation ratio (e.g., isotope-specific temporal accumulation ratio), and/or corresponding OPS data, as described herein. In related embodiments, the thickness and/or length of directional arrows 1140 may be configured to indicate the present accumulation ratio (e.g., any of an accumulation ratio, temporal accumulation ratio, and/or any isotope-specific accumulation ratios) within a selected accumulation time period, as described herein, where an accumulation ratio of 1 maximizes the thickness and/or length of directional arrows 1140, for example. In still further embodiments, the thickness and/or length of directional arrows 1140 may be configured to indicate the total number of detection event counts registered by one or more radiation detectors 340 within a selected accumulation time period, normalized so as not to extend beyond display boundary/relative angle scale 1144. In any such embodiments, radial length scale rings 1146 may be configured to help visually differentiate different length directional arrows 1146 due to, for example, different isotope-specific ionizing radiation flux, for example, or a changing range to a particular source.

In various embodiments, source localization display 1134 may include various informational indicators and/or selectors (e.g., buttons rendered on display 333 for selection by an operator through mouse click or finger touch) to provide feedback to an operator or otherwise facilitate operation of a directional radiation detector. For example, as shown in FIG. 11B, source localization display 1134 may include a mode indicator 1170 (e.g., whether the directional radiation detector is accumulating counts and/or for how long), a time indicator 1172, a power supply capacity indicator 1174, an accumulated and/or instantaneous dose rate indicator 1176, a source type discriminator 1178 (e.g., indicating the presence or lack of a particular source characteristic, such as the presence or lack of radiation indicative of neutron radiation), a scan initiation selector 1180 (e.g., to begin one or a series of accumulation time periods), and/or a mode exit selector 1182 (e.g., to end the present accumulation of counts and/or exit the present operational mode).

In some embodiments, source localization display 1134 may include operator graphic 1160, which may be configured to indicate a relative position and/or orientation of an operator of system 100, for example, and/or may be configured to change color and/or opacity to indicate an accumulated dose rate for an operator of system 100 (e.g., where relatively critical accumulated dose rates are identified by a range of critical colors, such as yellow or red). Source localization display 1134 may also include an animated compass mark 1114, for example, which may be configured to indicate the present absolute orientation of directional radiation detector 360 or 1060 (and by inference the absolute bearings towards detected sources within the present survey area), for example, or to indicate the absolute orientation of a particular time series of directional radiation sensor data, such as during playback of a particular survey. In such embodiments, time indicator 1172 may be configured to indicate the time associated with the particular directional radiation sensor data being displayed in source localization display 1134.

In FIG. 12, display view 1200 includes source localization display 1234 implemented as a bar gauge display rendered on display 333 as user feedback of operation of directional radiation detectors 160 and/or 1060, as described herein. For example, source localization display 1234 may include one or more relative direction indicators 1237 each including a variable bar 1240, for instance, and a corresponding source identifier 1236. In some embodiments, variable bars 1240 may be configured to indicate the present accumulation ratio associated with a pair of radiation detectors 340a,b and the number of detection event counts registered by each radiation detector 340a,b within a selected accumulation time period, as described herein, where an accumulation ratio of 1 fills variable bar 1240, and accumulation ratios greater than 1 reduce the height of variable bar 1240. In other embodiments, variable bars 1240 may be configured to indicate the present temporal accumulation ratio (e.g., isotope-specific temporal accumulation ratio) associated with a radiation detector 340a, two different accumulation times, and the number of detection event counts registered by radiation detector 340a at each accumulation time, as described herein.

FIGS. 13A-13B and 14A-14C illustrate display views rendered by user interface 332 (e.g., via display 333) for radiation source localization systems 100, 300, and/or 1000 in accordance with embodiments of the disclosure. In the embodiment shown in FIG. 13A, geospatial chart 1510 includes mobile platform indicator 110 and radiation heatmap overlay 1530 rendered over a base map or chart 1511. In various embodiments, system 100 may be configured to determine a shape, extent, and/or other characteristics of radiation heatmap overlay 1530 within geospatial chart 1510 based, at least in part, on directional radiation sensor data provided by directional radiation detector 160 and orientation and/or position data provided by orientation sensor 114, GNSS 118, OPS 167, and/or other orientation and/or position or motion sensors of mobile platform 110 or elements of mobile platform 110 as mobile platform maneuvers within the area shown in geospatial chart 1510. For example, system 100 may be configured to determine a dose rate or intensity distribution associated with radiological sources or contaminate concentrations, based on directional radiation sensor data and/or environmental conditions provided by mobile platform 110, and render radiation heatmap overlay 1530 according to a color mapping to indicate relative dose rates or intensities and/or radiological source concentrations (e.g., likelihoods), such as hot colors (e.g., red) to indicate relatively high dose rates or intensities of ionizing radiation and/or radiological source concentrations/likelihoods, and cold colors (e.g., blue) to indicate relatively low dose rates or intensities of ionizing radiation and/or radiological source concentrations/likelihoods. Such color mapping may be based on relative toxicity of corresponding radiological isotopes, for example (e.g., high toxicity radiological isotopes are red at relatively low estimated absolute concentrations/ppms), and/or on relative hazard to organics, structures, and/or machinery.

In some embodiments, system 100 may be configured to determine various characteristics of radiation heatmap overlay 1530, as displayed within geospatial chart 1510, based on environmental conditions associated with a survey area corresponding to base map or chart 1511. For example, system 100 may be configured to determine a position of a potential source 1532 of the ionizing radiation corresponding to radiation heatmap overlay 1530 based on directional radiation sensor data measured within geospatial chart 1510 (e.g., by directional radiation detector 160) and/or other environmental conditions affecting spatial evolution of the radiological sources or contaminates and/or detection of the radiological sources or contaminates by directional radiation detector 160 and/or mobile platform 110.

In another embodiment, system 100 may be configured to determine multiple types of sources are present within a particular survey area, for example, and render each type of source according to a different overlay layer presented in display view 1500, each of which may be selective enabled and/or disabled by a user. Segregated types of sources may include different radiological isotopes, as described herein.

In various embodiments, mobile platform 110 may be configured to adjust its course based on directional radiation sensor data provided by directional radiation detector 160, for example, and/or based on various environmental conditions measured by sensors mounted to mobile platform 110 or by external systems and communicated to system 100 (e.g., such as regional weather data provided by an online database over a wireless network linked to base station 130 or co-pilot station 230). As such, mobile platform 110 may be configured to autonomously avoid entering hazardous radiological plumes (e.g., hazardous dose rates or intensities of ionizing radiation within a particular radiological plume) or environments (e.g., significant downdrafts or otherwise undesirable environmental conditions and/or hazardous radiological plumes within such undesirable environmental conditions). For example, sending a UAV/UGV into a hazardous environment can put mobile platform 110 at risk of damage or contamination requiring replacement or decontamination. By adding intelligent hazard avoidance based on analyte and environmental sensors carried on-vehicle, hazard exposure can be limited through automatic course adjustment, thereby protecting mobile platform 110 and its associated sensor suite.

Embodiments described herein may provide for autonomous reaction to directional radiation sensor data and/or environmental sensor data. For example, controller 112 and/or a controller of base station 130 or co-pilot station 230 may be configured to receive directional radiation sensor data and/or environmental sensor data from mobile platform 110 and/or from sensors mounted to mobile platform 110 and to determine course adjustments to avoid detected hazardous radiological plumes and/or environmental conditions. Examples of course adjustments may include halt, climb, and/or reverse course to retreat from a dangerous environment. Such course adjustments may be relayed to a user of base station 130, for example, or may be implemented directly/autonomously by mobile platform 110. Such autonomous response is intended to preserve the integrity of mobile platform 110 and avoid carrying contamination into other non-contaminated areas. In general, hazard avoidance course corrections may interrupt manual flight/control or an automatically planned flight/course. A pilot/user may be provided various selectors within a display view, for example, to be able to abort autonomous operations if desired should it be deemed inappropriate for the situation.

Figure 13A:
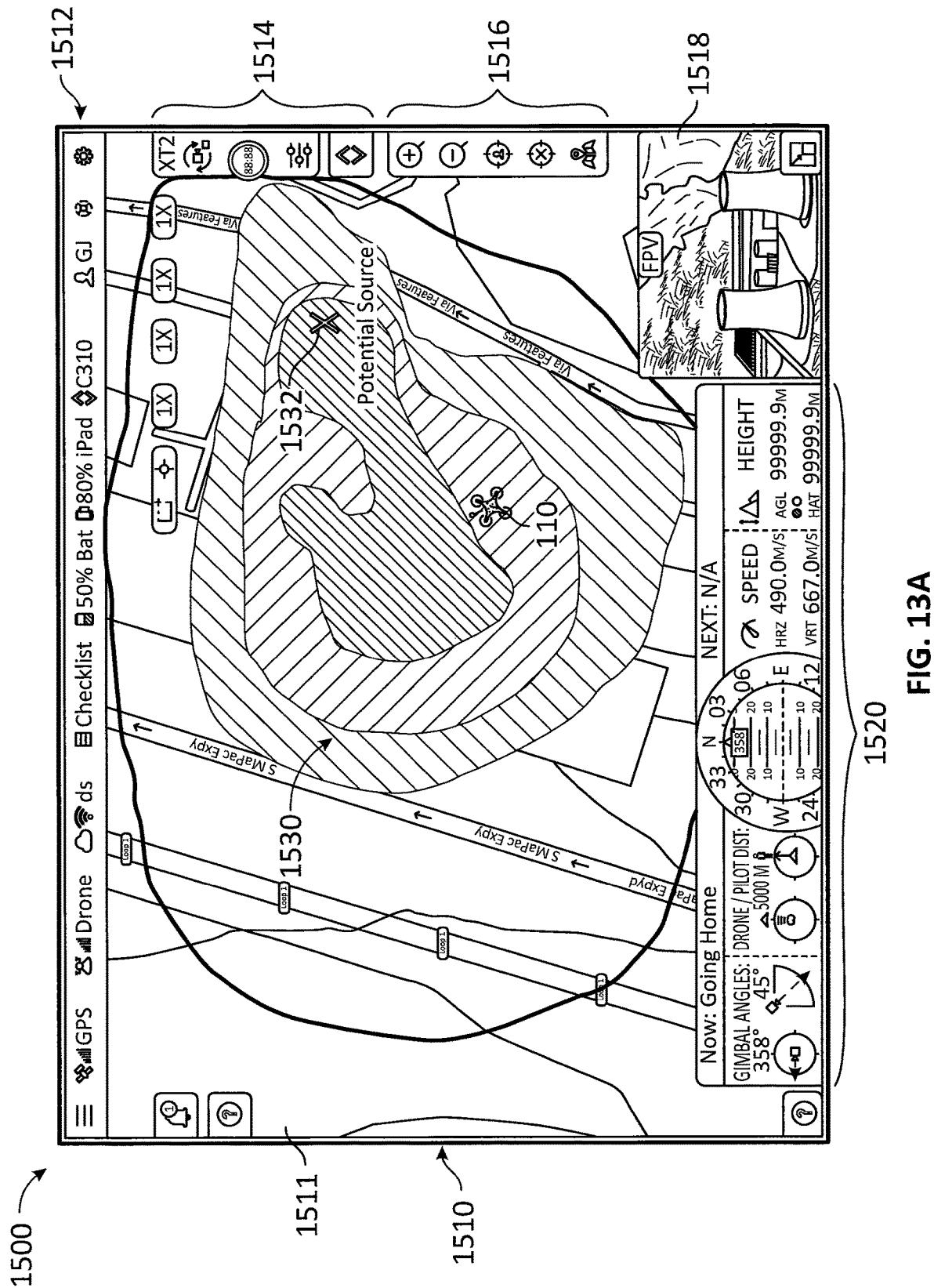
FIGS. 13A-13B and 14A-14C illustrate display views rendered by a user interface for a radiation source localization system in accordance with embodiments of the disclosure.
Figure 13B:
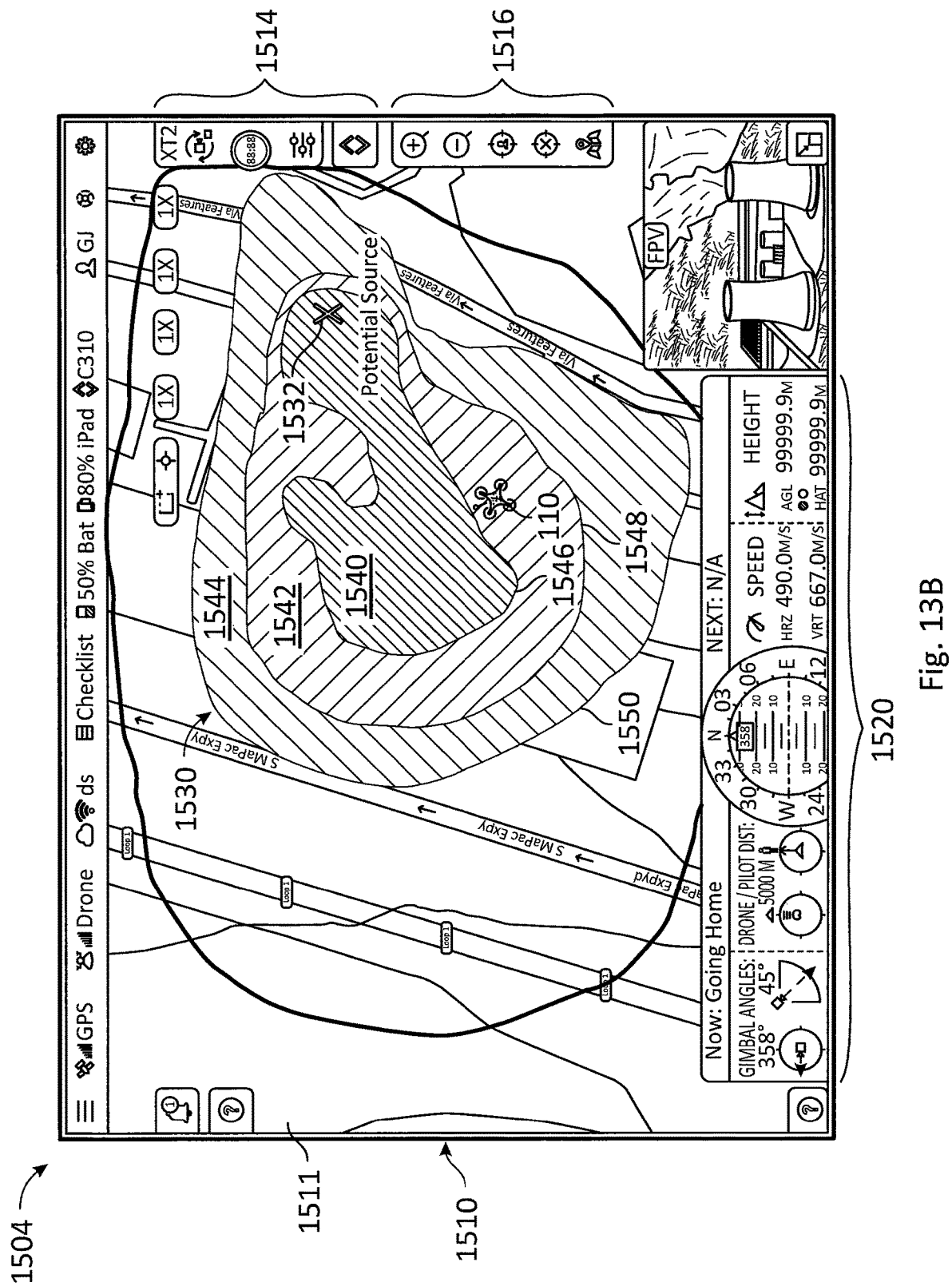

In the embodiment shown in FIG. 13B, display view 1504 includes many of the same features of display view 1500, and additionally includes dose rate or ionizing radiation intensity and/or radiological source concentration/likelihood boundaries 1546-1550 bounding respective dose rate or ionizing radiation intensity and/or radiological source concentration/likelihood segments 1540-1544, as shown. For example, mobile platform 110 may approach or enter relatively high dose rate or ionizing radiation intensity and/or radiological source concentration/likelihood segment 1540, receive directional radiation sensor data from directional radiation detector 160 indicating a hazardous dose rate or ionizing radiation intensity and/or radiological source concentration/likelihood, and trigger rendering of hazard warning menu on base station 130 or co-pilot station 230. A pilot or co-pilot may select a dose rate or ionizing radiation intensity and/or radiological source concentration/likelihood contour mapping selector to cause mobile platform 110 to enter a dose rate or ionizing radiation intensity and/or radiological source concentration/likelihood contour mapping mode, and mobile platform 110 may autonomously maneuver mobile platform 110 about the survey area to determine the extents of dose rate or ionizing radiation intensity and/or radiological source concentration/likelihood segments 1540-1544 and/or the spatial contours of dose rate or ionizing radiation intensity and/or radiological source concentration/likelihood boundaries 1546-1550, as shown.

More generally, a pilot or co-pilot may select a dose rate or ionizing radiation intensity and/or radiological source concentration/likelihood contour mapping selector at any time, regardless of whether mobile platform 110 has entered any portion of the survey area corresponding to radiation heatmap overlay 1530. Such autonomous contour mapping provides substantially quicker contour mapping than manual techniques, for example, and a resolution of such mapping may be adjusted to increase spatial definition and reduce mapping speed, or vice versa. In related embodiments, mobile platform 110 may be configured with a dose rate or ionizing radiation intensity and/or radiological source concentration/likelihood finder mode, where upon selection of such mode, mobile platform 110 may be configured to maneuver mobile platform 110 about the survey area corresponding to radiation heatmap overlay 1530 to find a highest or lowest dose rate or ionizing radiation intensity and/or radiological source concentration/likelihood within the survey area shown in geospatial chart 1510.

Figure 14A:
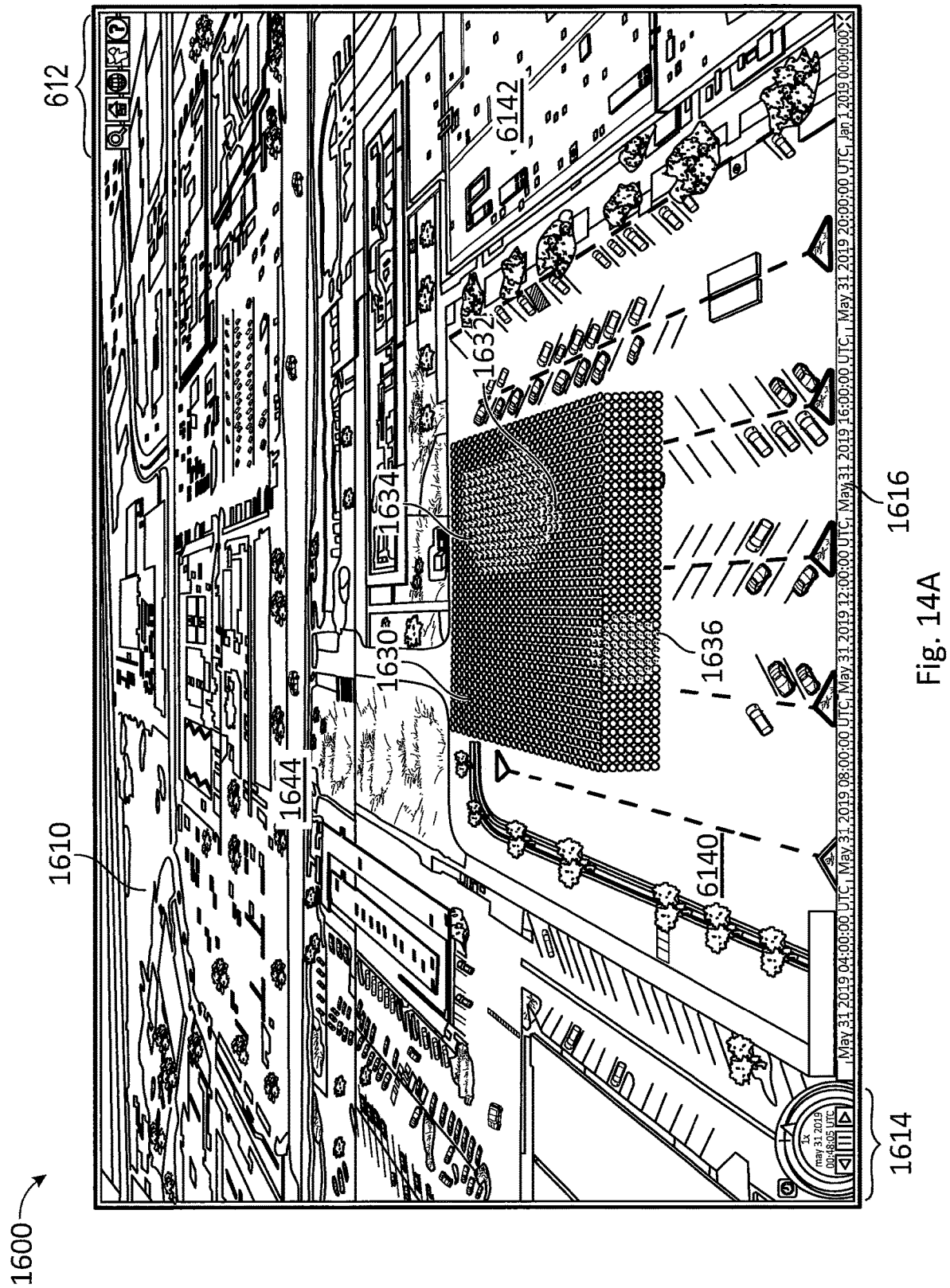
Figure 14B:
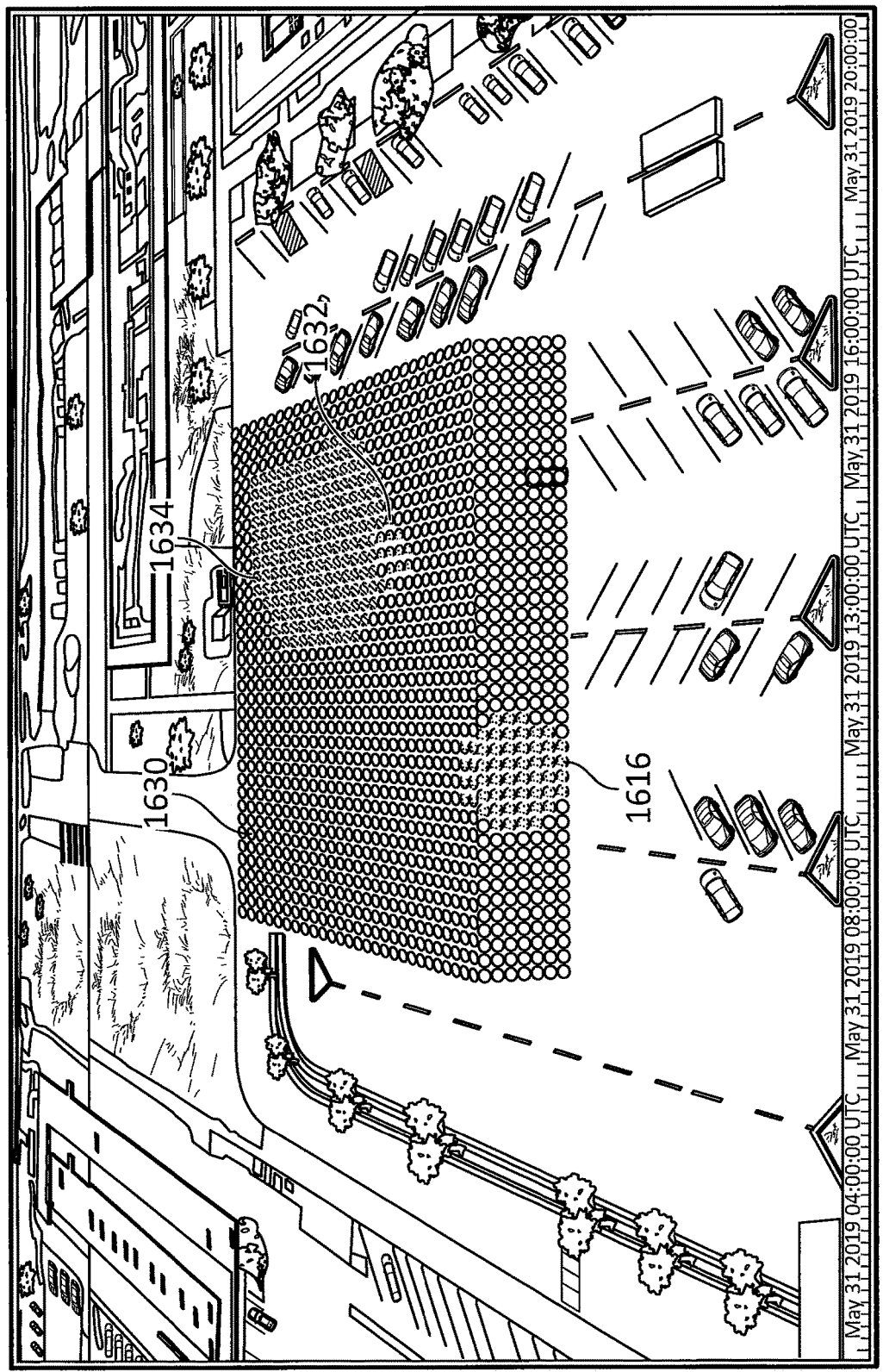
Figure 14C:
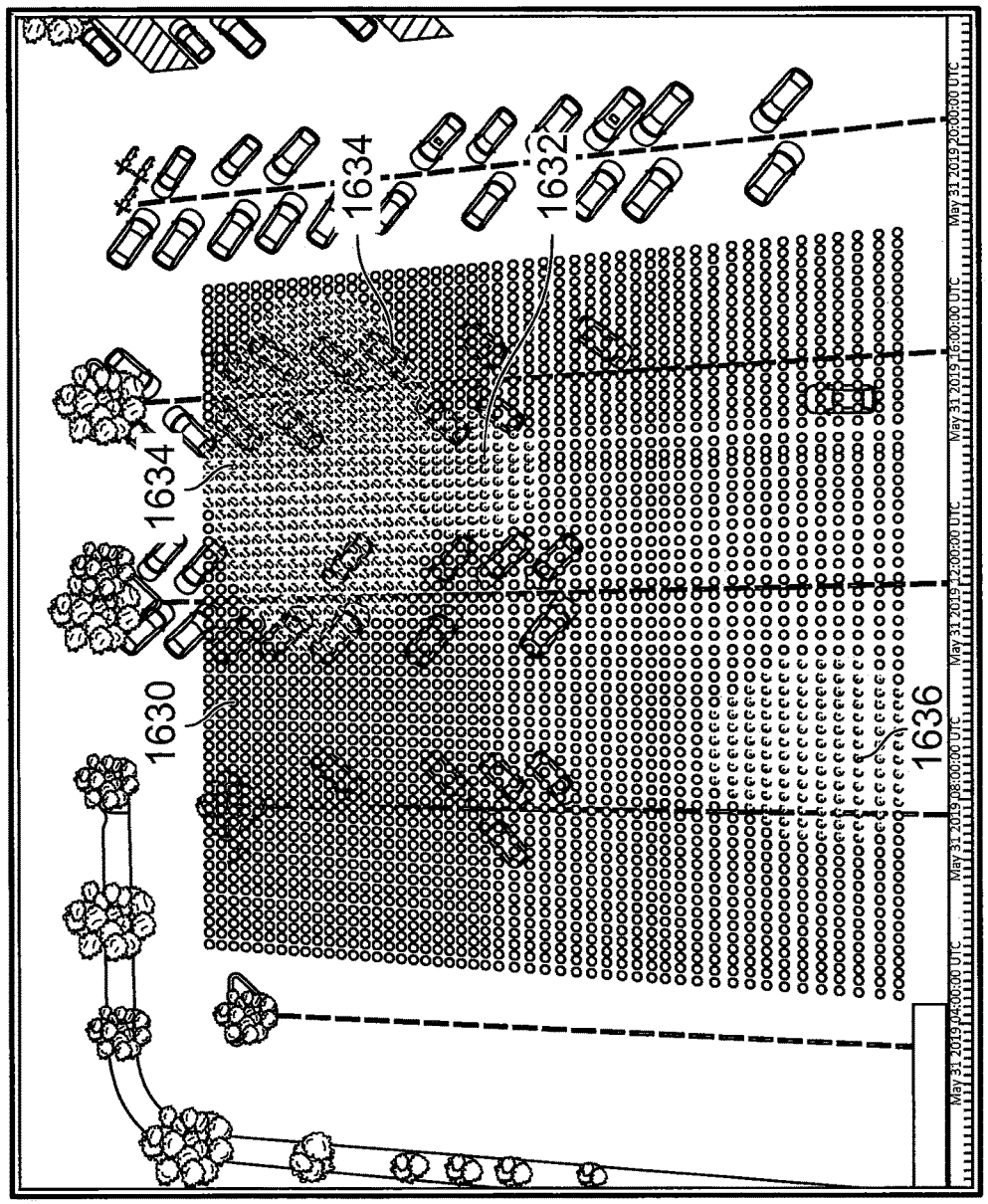

In various embodiments, dose rate or ionizing radiation intensity and/or radiological source concentration/likelihood contour mapping and/or other operational modes of mobile platform 110 may be performed in a plane, such as at a selected altitude, for example, or may be performed volumetrically (e.g., in three dimensions), such as to generate three-dimensional dose rate or ionizing radiation intensity and/or radiological source concentration/likelihood contours. For example, FIGS. 14A-C illustrate display views 1600, 1602, 1604 rendered by a user interface (e.g., user interface 132 of base station 130 and/or co-pilot station 230) for system 100 in accordance with an embodiment of the disclosure. In particular, display views 1600, 1602, 1604 provide three dimensional views of radiological plumes within a survey area 1630. As shown in FIG. 14A, survey area 1630 is disposed above a parking lot 1640 between multiple buildings 1642 and adjacent a highway 1644, all shown in three-dimensional geospatial chart 1610. In display view 1600, survey area/point cloud 1630 includes three radiological plume overlays/point clouds 1632, 1634, and 1636 corresponding to three radiological plumes within the survey area. In particular, radiological plume point clouds 1632 and 1636 correspond to one type of radiological source, and radiological plume point cloud 1634 corresponds to a different type of radiological source.

Also shown in display view 1600 are various selectors and/or indicators configured to receive user selection of a particular selector to adjust a perspective or other characteristic of display view 1600, geospatial chart 1610, and/or point clouds 1630-1636, for example, or to indicate a status of geospatial chart 1610 and/or point clouds 1630-1636, for example. In particular, header 1612 may include selectors configured to allow a user to change a zoom level or view perspective of display view 1600, time evolution controller 1614 may include selectors configured to allow a user to render any one or more of point clouds 1630-1636 according to a selected time stamp or to animate one or more of point clouds 1630-1636 according to a selected time period and/or rate (e.g., to show how each radiological plume evolves over time), and timeline indicator 1616 may be configured to indicate a particular time or range of times corresponding to a time stamp and/or animation of point clouds 1630-1636. Display view 1602 of FIG. 14B shows a zoomed in perspective of survey area 1630 and radiological plume overlays/point clouds 1632-36, and display view 1604 of FIG. 14C shows a top-down perspective of survey area 1630 and radiological plume overlays/point clouds 1632-36.

In the embodiments shown in FIGS. 14A-C, points within survey area 1630 are colored a neutral color to indicate that the corresponding area has been sampled but no hazardous radiation has been detected. Points within radiological plumes 1630 are colored hot (e.g., red) to indicate relatively high dose rate or ionizing radiation intensity and/or radiological source concentration/likelihood and colored cold (e.g., blue) to indicate relatively low dose rate or ionizing radiation intensity and/or radiological source concentration/ likelihood. In other embodiments, different radiological isotopes may be assigned different colors, for example, and other characteristics of the point clouds (e.g., saturation, opacity, point diameter, and/or other characteristics) may be used to convey dose rate or ionizing radiation intensity and/or radiological source concentration/likelihood to a user. Portions of display views 1600-1604 without points have not been sampled.

Where applicable, various embodiments provided by the present disclosure can be implemented using hardware, software, or combinations of hardware and software. Also, where applicable, the various hardware components and/or software components set forth herein can be combined into composite components comprising software, hardware, and/ or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

The invention claimed is:

1. A system comprising:
a directional radiation detector;
a logic device configured to communicate with a communications module and the directional radiation detector coupled to a mobile platform, wherein the communications module is configured to establish a wireless communication link with a base station associated with the mobile platform, the directional radiation detector comprises a sensor assembly comprising first and second radiation detectors configured to provide directional radiation sensor data to determine a direction of a radiological source as the mobile platform is maneuvered within a survey area, and the logic device is configured to:
receive the directional radiation sensor data as the mobile platform maneuvers within the survey area,
receive orientation and/or position data corresponding to the directional radiation sensor data, and
generate radiation source localization survey information corresponding to the survey area based, at least in part, on a combination of the orientation and/or position data and the directional radiation sensor data;
a planar collimating panel, wherein the first and second radiation detectors comprise respective first and second scintillators and/or semiconductor detectors that are separated from each other by the planar collimating panel along a direction perpendicular to a sensor axis of the sensor assembly; and
wherein the directional radiation sensor data is represented by a ratio of counts accumulated in the first and second radiation detectors.

2. The system of claim 1, further comprising:
the mobile platform;
an orientation and/or position sensor coupled to the mobile platform and configured to provide the orientation and/or position data; and
a radiation sensor cradle coupled to the mobile platform and configured to mount the directional radiation detector to the mobile platform and/or orient the directional radiation detector relative to the mobile platform.

3. The system of claim 1, wherein:
the first and second radiation detectors are aligned to the sensor axis of the sensor assembly; and
the planar collimating panel is coplanar with the sensor axis of the sensor assembly.

4. The system of claim 3, wherein:
the first and second radiation detectors comprise respective first and second silicon photomultipliers (SiPMs); and
the first and second SiPMs are coupled to a common printed circuit board disposed within a housing of the directional radiation detector.

5. The system of claim 3, wherein:
the first and second scintillators are cubic, cylindrical, or rectangular and bonded to opposing surfaces of the planar collimating panel; and
the planar collimating panel is sized to fully occlude at least the first scintillator of the first radiation detector from the second scintillator of the second radiation detector.

6. The system of claim 1, further comprising a user interface associated with the mobile platform, wherein the logic device is configured to:
render a display view comprising the radiation source localization survey information and/or one or more relative direction indicators via a display of the user interface.

7. The system of claim 1, wherein the logic device is configured to:
detect entry of the mobile platform into a hazardous portion of the survey area based, at least in part, on the radiation source localization survey information; and
adjust a course of the mobile platform to avoid the hazardous portion of the survey area.

8. The system of claim 1, wherein the logic device is configured to:
determine one or more dose rate and/or radioactive source concentration boundaries based, at least in part, on the radiation source localization survey information; and
render a display view comprising the dose rate and/or radioactive source concentration boundaries in a display of a user interface associated with the mobile platform.

9. The system of claim 1, further comprising an imaging module coupled to the mobile platform, wherein the logic device is configured to:
receive visible spectrum and/or infrared images of the survey area from the imaging module as the mobile platform maneuvers within the survey area; and
generate the radiation source localization survey information corresponding to the survey area based, at least in part, on a combination of the orientation and/or position data, the directional radiation sensor data, and the visible spectrum and/or infrared images of the survey area.

10. A method comprising:
receiving, from a directional radiation detector coupled to a mobile platform as the mobile platform maneuvers within a survey area, directional radiation sensor data to determine a direction of a radiological source, wherein the directional radiation detector comprises a sensor assembly comprising first and second radiation detectors;
receiving orientation and/or position data corresponding to the directional radiation sensor data;
generating radiation source localization survey information corresponding to the survey area based, at least in part, on a combination of the orientation and/or position data and the directional radiation sensor data;
wherein the first and second radiation detectors comprise respective first and second scintillators and/or semiconductor detectors that are separated from each other, along a direction perpendicular to a sensor axis of the sensor assembly, by a planar collimating panel; and
wherein the directional radiation sensor data is represented by a ratio of counts accumulated in the first and second radiation detectors.

11. The method of claim 10, wherein:
the receiving the orientation and/or position data comprises receiving the orientation and/or position data from an orientation and/or position sensor coupled to the mobile platform.

12. The method of claim 10, wherein:
the first and second radiation detectors are aligned to the sensor axis of the sensor assembly; and
the planar collimating panel is coplanar with the sensor axis of the sensor assembly.

13. The method of claim 12, wherein:
the first and second radiation detectors comprise respective first and second silicon photomultipliers (SiPMs); and
the first and second SiPMs are coupled to a common printed circuit board disposed within a housing of the directional radiation detector.

14. The method of claim 10, wherein:
the first and second scintillators are bonded to opposing surfaces of the planar collimating panel; and
the planar collimating panel is sized to fully occlude at least the first scintillator of the first radiation detector from the second scintillator of the second radiation detector.

15. The method of claim 10, further comprising:
rendering a display view comprising the radiation source localization survey information and/or one or more relative direction indicators via a display of the user interface.

16. The method of claim 10, further comprising:
detecting entry of the mobile platform into a hazardous portion of the survey area based, at least in part, on the radiation source localization survey information; and
adjusting a course of the mobile platform to avoid the hazardous portion of the survey area.

17. The method of claim 10, further comprising:
determining one or more dose rate and/or radioactive source concentration boundaries based, at least in part, on the radiation source localization survey information; and
rendering a display view comprising the dose rate and/or radioactive source concentration boundaries in a display of a user interface associated with the mobile platform.

18. The method of claim 10, further comprising:
receiving visible spectrum and/or infrared images of the survey area from an imaging module as the mobile platform maneuvers within the survey area; and generating the radiation source localization information corresponding to the survey area based, at least in part, on a combination of the orientation and/or position data, the directional radiation sensor data, and the visible spectrum and/or infrared images of the survey area.

\* \* \* \* \*